US012651575B2

(12) United States Patent
Park

(10) Patent No.: US 12,651,575 B2
(45) Date of Patent: Jun. 9, 2026

(54) SCAN DRIVING CIRCUIT AND DISPLAY DEVICE INCLUDING THE SAME

(71) Applicant: Samsung Display Co., Ltd., Yongin-Si (KR)

(72) Inventor: Junhyun Park, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 241 days.

(21) Appl. No.: 18/581,393

(22) Filed: Feb. 20, 2024

(65) Prior Publication Data

US 2025/0006135 A1 Jan. 2, 2025

(30) Foreign Application Priority Data

Jun. 27, 2023 (KR) ........................ 10-2023-0082409

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0842* (2013.01); *G09G 2300/0861* (2013.01); *G09G 2310/0291* (2013.01); *G09G 2310/08* (2013.01); *G09G 2330/021* (2013.01)

(58) Field of Classification Search
CPC ............... G09G 3/3266; G09G 3/3233; G09G 2300/0819; G09G 2300/0842; G09G 2300/0861; G09G 2310/0291; G09G 2310/08; G09G 2330/021
See application file for complete search history.

(56) References Cited

U.S. PATENT DOCUMENTS

| | | | | |
|---|---|---|---|---|
| 11,341,916 | B2 | 5/2022 | Lee et al. | |
| 11,527,204 | B2 | 12/2022 | Park et al. | |
| 2021/0327368 | A1 * | 10/2021 | Park | G09G 3/3275 |
| 2023/0178003 | A1 | 6/2023 | Kim et al. | |
| 2024/0257696 | A1 * | 8/2024 | Noh | G09G 3/3266 |

FOREIGN PATENT DOCUMENTS

| | | | |
|---|---|---|---|
| KR | 10-2019-0142791 | A | 12/2019 |
| KR | 10-2021-0050626 | A | 5/2021 |
| KR | 10-2023-0084400 | A | 6/2023 |

* cited by examiner

*Primary Examiner* — Priyank J Shah
(74) *Attorney, Agent, or Firm* — Innovation Counsel LLP

(57) ABSTRACT

Disclosed is a display device including a pixel and a first scan driving circuit that applies a write scan signal to the pixel in response to a write clock signal. The first scan driving circuit outputs the write scan signal having a first operating frequency in a normal mode, and outputs the write scan signal having a second operating frequency lower than the first operating frequency in a low-frequency mode. The write clock signal has a direct current (DC) level in the low-frequency mode in response to a first set signal applied to the first scan driving circuit.

20 Claims, 28 Drawing Sheets

SCAN DRIVING CIRCUIT AND DISPLAY DEVICE INCLUDING THE SAME

CROSS-REFERENCE TO RELATED APPLICATIONS

This application claims priority under 35 U.S.C. § 119 to Korean Patent Application No. 10-2023-0082409 filed on Jun. 27, 2023, in the Korean Intellectual Property Office, the disclosures of which are incorporated by reference herein in their entireties.

BACKGROUND

Embodiments of the present disclosure described herein relate to a scan driving circuit and a display device including the same.

Generally, electronic devices, which provide images to users, such as a smartphone, a digital camera, a notebook computer, a navigation system, and a smart television, include a display device for displaying the images. The display device generates an image and provides the users with the generated image through a display screen.

The display device includes a plurality of pixels for generating an image, a scan driving circuit for applying scan signals to pixels, a data driver for applying data voltages to the pixels, and a light emitting driver for applying emission signals to the pixels. The pixels receive the data voltages in response to the scan signals. The pixels display an image by emitting light of luminance corresponding to the data voltages in response to the emission signals.

The pixels may display a video and a still image. When the pixels display the video, the pixels may receive images thus continuously updated. When the pixels display the still image, the pixels maintains an image initially provided, and may not receive images afterward.

SUMMARY

Embodiments of the present disclosure provide a scan driving circuit capable of reducing power consumption and a display device including the same.

According to an embodiment, a display device includes a pixel and a first scan driving circuit that applies a write scan signal to the pixel in response to a write clock signal. The first scan driving circuit outputs the write scan signal having a first operating frequency in a normal mode, and outputs the write scan signal having a second operating frequency lower than the first operating frequency in a low-frequency mode. The write clock signal has a direct current (DC) level in the low-frequency mode in response to a first set signal applied to the first scan driving circuit.

According to an embodiment, a display device includes a pixel that receives a scan signal, and a scan driving circuit that outputs the scan signal having a first operating frequency during a normal mode, and outputs the scan signal having a second operating frequency less than the first operating frequency during a low-frequency mode. The scan driving circuit includes a first node controller connected to a first node and a second node and receiving a first high voltage, a first low voltage having a level lower than the first high voltage, a start signal, a first clock signal, and a second clock signal having a phase opposite to a phase of the first clock signal, and controlling voltage levels of the first node and the second node, a first buffer part connected to the first node and receiving the first high voltage, a second buffer part connected to the second node and receiving either one clock signal among the first clock signal and the second clock signal or the first low voltage, and a switching element connected to an input terminal for receiving the start signal and the second node and switched by a set signal. The first buffer part and the second buffer part output the scan signal depending on the voltage levels of the first node and the second node. The switching element is turned off in response to the set signal when the scan signal is not applied to the pixel in the low-frequency mode.

According to an embodiment, a scan driving circuit includes a node controller connected to a first node and a second node and receiving a first high voltage, a first low voltage having a level lower than the first high voltage, a start signal, a first clock signal, and a second clock signal having a phase opposite to a phase of the first clock signal, and controlling voltage levels of the first node and the second node, a first buffer part connected to the first node and receiving the first high voltage, a second buffer part connected to the second node and receiving either one clock signal among the first clock signal and the second clock signal or the first low voltage, and a set part connected to the first node and the second node and receiving the first high voltage, the first low voltage, and a set signal. The first buffer part and the second buffer part output a scan signal depending on the voltage levels of the first node and the second node. The set part sets the voltage levels of the first node and the second node in response to the set signal such that a deactivated scan signal is output.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
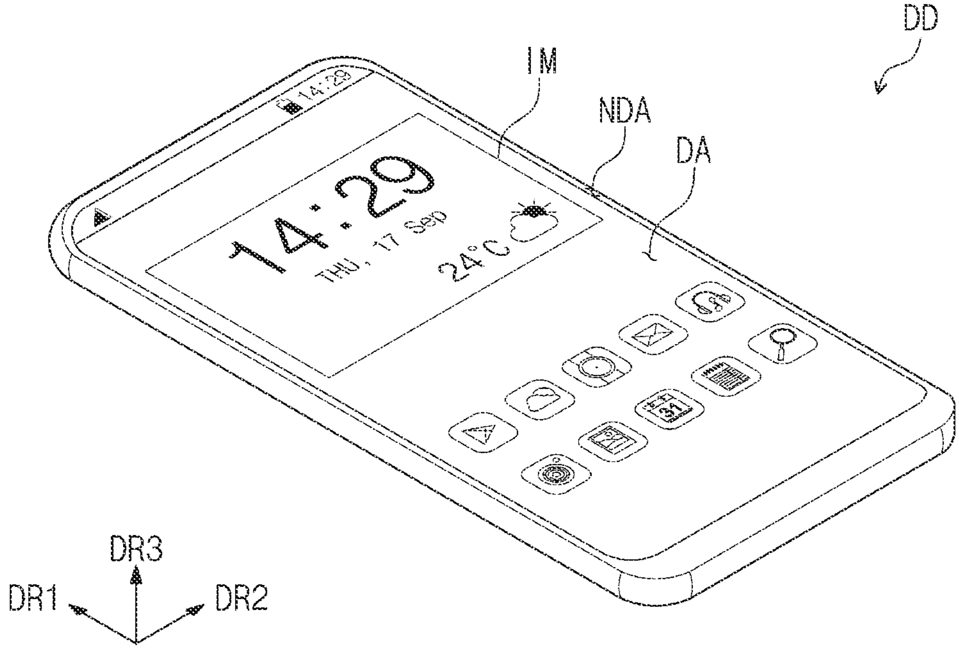
FIG. 1 is a perspective view of a display device according to an embodiment of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components. Also, in drawings, the thickness, ratio, and dimension of components are exaggerated for effectiveness of description of technical contents.

The expression "and/or" includes all combinations of one or more of the associated listed items.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Hereinafter, embodiments of the present disclosure will be described with reference to accompanying drawings.

FIG. 1 is a perspective view of a display device according to an embodiment of the present disclosure.

Referring to FIG. 1, a display device DD according to an embodiment of the present disclosure may have long sides extending in a first direction DR1, and may have short sides extending in a second direction DR2 crossing the first direction DR1. Each of corners of the display device DD may have a round shape. The shape of the display device DD shown in FIG. 1 is shown as an example, and the shape of the display device DD is not limited to the shape shown in FIG. 1.

Hereinafter, a direction substantially perpendicular to a plane defined by the first direction DR1 and the second direction DR2 is defined as a third direction DR3.

Images IM generated by the display device DD may be provided to a user through an upper surface of the display device DD when viewed in the third direction DR3. The upper surface of the display device DD may include a display area DA and a non-display area NDA around the display area DA. The display area DA may display an image, and the non-display area NDA may not display an image. The non-display area NDA may surround the display area DA and may define a border of the display device DD printed in a predetermined color.

The display device DD is illustrated as a mobile phone, but is not limited thereto. For example, the display device DD may be used in various electronic devices. For example, the display device DD may be used for a large electronic device such as a television, a monitor, or an outer billboard. Moreover, the display device DD may be used for small and medium electronic devices such as a personal computer, a notebook computer, an automotive navigation system, a game console, a tablet, or a camera.

Figure 2:
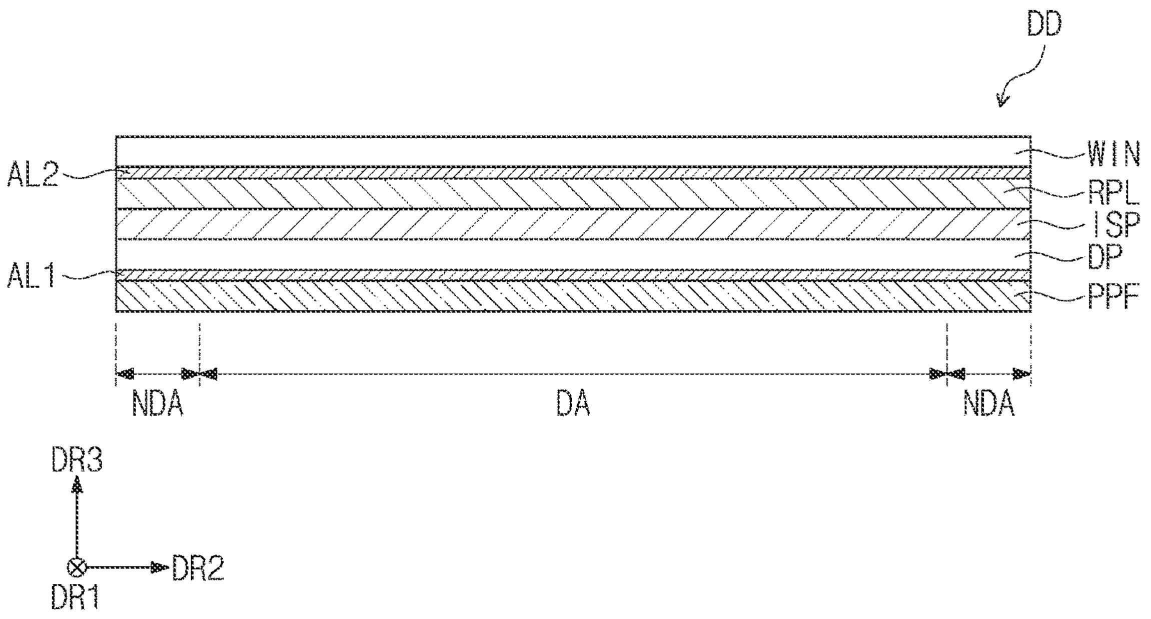
FIG. 2 is a diagram illustrating a cross-section of the display device shown in FIG. 1.

FIG. 2 is a diagram illustrating a cross-section of the display device shown in FIG. 1.

FIG. 2 illustrates a cross-section of the display device DD when viewed in the first direction DR1.

Referring to FIG. 2, the display device DD may include a display panel DP, an input sensing part ISP, an anti-reflection layer RPL, a window WIN, a panel protection film PPF, and first and second adhesive layers AL1 and AL2.

According to an embodiment of the present disclosure, the display panel DP may include a light emitting display panel. For example, the display panel DP may be an organic light emitting display panel or an inorganic light emitting display panel. A light emitting layer of the organic light emitting display panel may include an organic light emitting material. A light emitting layer of the inorganic light emitting display panel may include a quantum dot, a quantum rod, or the like. Hereinafter, it is described that the display panel DP is an organic light emitting display panel.

The input sensing part ISP may be disposed on the display panel DP. The input sensing part ISP may include a plurality of sensing parts (not illustrated) for sensing an external input in a capacitive scheme. When the display device DD is manufactured, the input sensing part ISP may be directly formed on the display panel DP. However, an embodiment is not limited thereto, and the input sensing part ISP may be manufactured as a separate panel from the display panel DP and attached to the display panel DP by an adhesive layer.

The anti-reflection layer RPL may be disposed on the input sensing part ISP. When the display device DD is manufactured, the anti-reflection layer RPL may be directly formed on the input sensing part ISP. However, an embodiment is not limited thereto, and the anti-reflection layer RPL may be manufactured as a separate panel and attached to the input sensing part ISP by an adhesive layer.

The anti-reflection layer RPL may be an external light anti-reflection film. The anti-reflection layer RPL may reduce the reflectance of external light incident from the top surface of the display device DD toward the display panel DP. The external light may not be perceived to a user due to the anti-reflection layer RPL.

When external light directed toward the display panel DP is reflected from the display panel DP and provided again to an external user, the user may visually perceive the external light, like a mirror. To prevent this phenomenon, the anti-reflection layer RPL may include a plurality of color filters for displaying the same color as the pixels of the display panel DP.

The color filters may filter the external light to the same color as pixels. In this case, the external light may not be perceived by the user. However, an embodiment is not limited thereto, and the anti-reflection layer RPL may include a phase retarder and/or a polarizer to reduce the reflectance of external light.

The window WIN may be disposed on the anti-reflection layer RPL. The window WIN may protect the display panel DP, the input sensing part ISP, and the anti-reflection layer RPL from external scratches and impacts.

The panel protection film PPF may be disposed under the display panel DP. The panel protection film PPF may protect a bottom surface of the display panel DP. The panel protection film PPF may include a flexible plastic material such as polyethyleneterephthalate (PET).

The first adhesive layer AL1 may be interposed between the display panel DP and the panel protection film PPF, and the display panel DP and the panel protection film PPF may be bonded to each other by the first adhesive layer AL1. The second adhesive layer AL2 may be interposed between the window WIN and the anti-reflection layer RPL, and the window WIN and the anti-reflection layer RPL may be bonded to each other by the second adhesive layer AL2.

Figure 3:
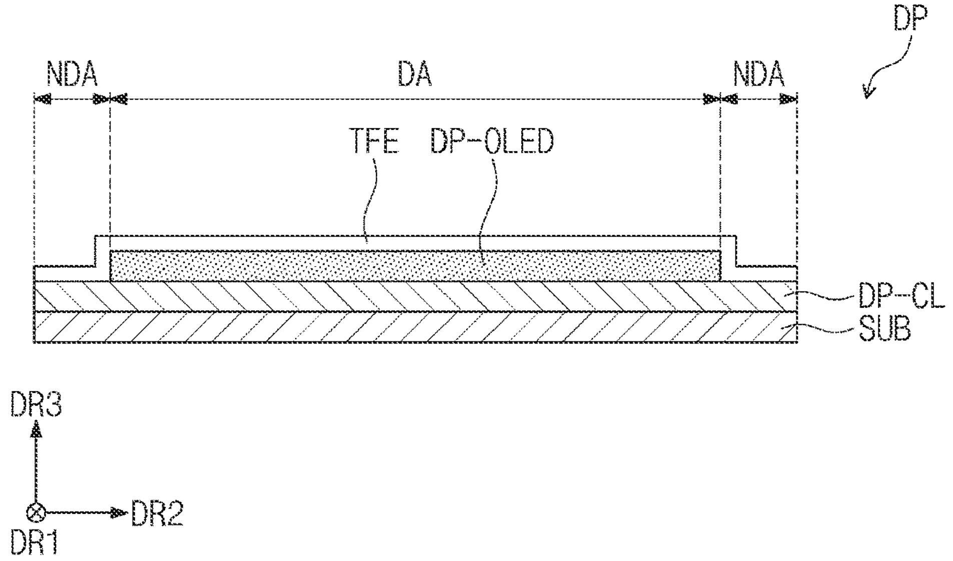
FIG. 3 is a diagram illustrating a cross-section of the display panel shown in FIG. 2.

FIG. 3 is a diagram illustrating a cross-section of the display panel shown in FIG. 2.

FIG. 3 illustrates a cross-section of the display panel DD when viewed in the first direction DR1.

Referring to FIG. 3, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include the display area DA and the non-display area NDA around the display area DA. The substrate SUB may include a flexible plastic material such as glass or polyimide (PI). The display element layer DP-OLED may be disposed in the display area DA.

A plurality of pixels may include the circuit element layer DP-CL and the display element layer DP-OLED. Each of the pixels may include a transistor disposed in the circuit element layer DP-CL and a light emitting element disposed in the display element layer DP-OLED and connected to a transistor.

The thin film encapsulation layer TFE may be disposed on the circuit element layer DP-CL so as to cover the display element layer DP-OLED. The thin film encapsulation layer TFE may protect pixels from moisture, oxygen, and foreign objects.

Figure 4A:
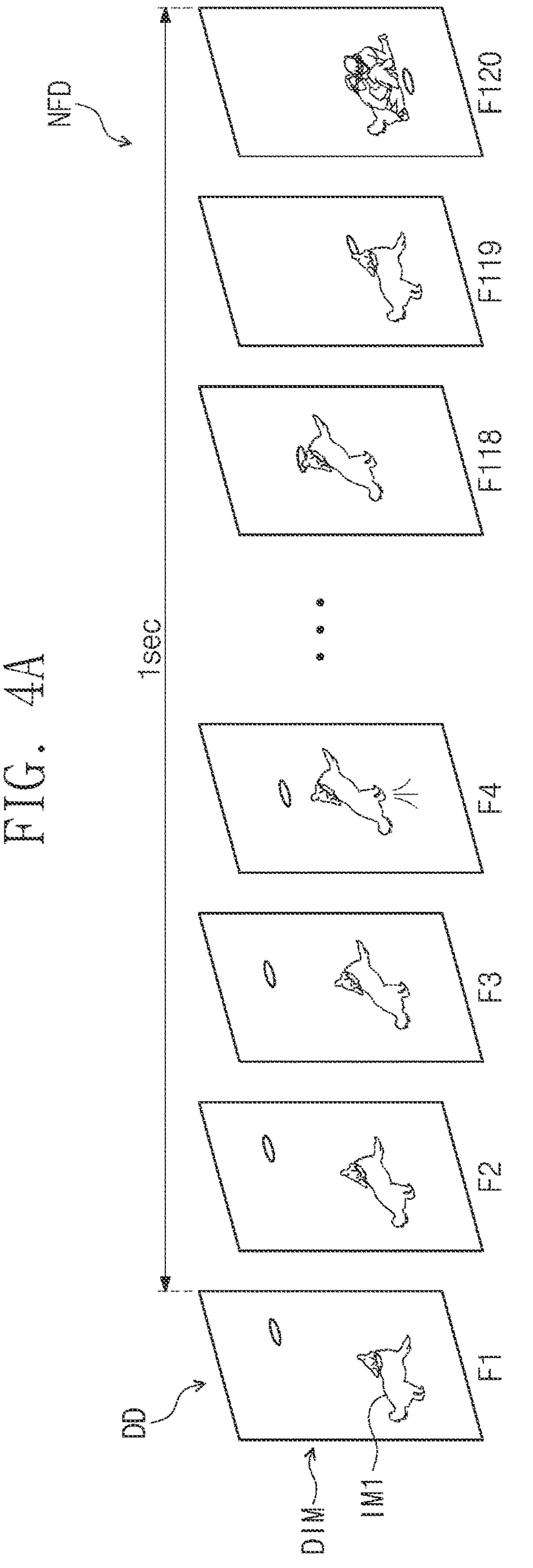
FIG. 4A is a diagram for describing an operation of a display device in a normal mode.
Figure 4B:
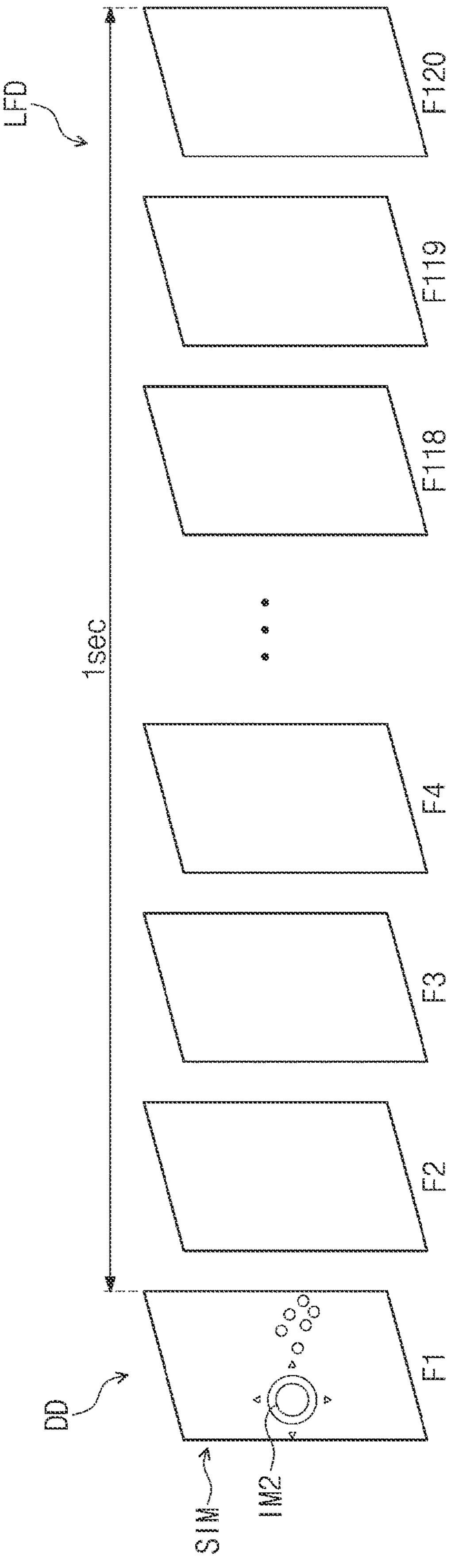
FIG. 4B is a diagram for describing an operation of a display device in a low-frequency mode.

FIG. 4A is a diagram for describing an operation of a display device in a normal mode. FIG. 4B is a diagram for describing an operation of a display device in a low-frequency mode.

Referring to FIGS. 4A and 4B, the display device DD may be driven by a normal mode NFD and a low-frequency mode LFD. The normal mode NFD may be defined as a video mode for displaying a video DIM. The low-frequency mode LFD may be defined as a still image mode for displaying a still image SIM. In the normal mode NFD, the display device DD may display the video DIM. In the low-frequency mode LFD, the display device DD may display the still image SIM.

In the normal mode NFD, the display device DD may be driven at a first operating frequency (or a normal frequency). In the low-frequency mode LFD, the display device DD may be driven at a second operating frequency. The second operating frequency may be less than the first operating frequency.

Referring to FIG. 4A, when the display device DD displays the video DIM in the normal mode NFD, the first operating frequency may be set to 120 Hz. For example, 120 images IM1 may be provided to the display panel DP by 120 frames per second. The images IM1 of first to 120th frames F1 to F120 per 1 second are provided to the display panel DP, and the video DIM may be displayed.

From the first frame F1 to the 120th frame F120, the images IM1 may be updated and provided to the display panel DP. To display the video DIM, during the first frame F1 to the 120th frame F120, the image IM1 of the current frame is different from the image IM1 of the previous frame, and may be an image IM1 updated from the previous frame. To display the video DIM, continuously updated images IM1 may be provided to the display panel DP.

Referring to FIG. 4B, when the display device DD displays the still image SIM in the low-frequency mode LFD, the second operating frequency may be set to 1 Hz. In this case, in the first frame F1, the image IM2 may be provided to the display panel DP. During the second to 120th frames F2 to F120, the image IM2 may not be provided to the display panel DP. That is, the second operating frequency may be set to 1 Hz such that the image IM2 may be provided to the display panel DP once per 1 second.

In the low-frequency mode LFD, the display panel DP may maintain the image IM2 received in the first frame F1 during the second to 120th frames F2 to F120. For example, the pixels may store and display the image IM2 received during the first frame F1, and may display the image IM2 by maintaining the image IM2 during the second to 120th frames F2 to F120. Accordingly, the image IM2 may remain unchanged such that the still image SIM is displayed.

For example, a video may indicate an image that changes in real time like a movie. The still image may indicate a non-moving image such as a keyboard.

The second operating frequency is set to 1 Hz, but is not limited thereto. For example, the second operating frequency may be variously changed to 60 Hz, 30 Hz, 10 Hz, and the like. That is, the display panel DP may receive an image 60 times, 30 times, or 10 times per 1 second. In this case, in frames, in each of which an image is not received, among 120 frames, an image of previous frames may be maintained.

Figure 5:
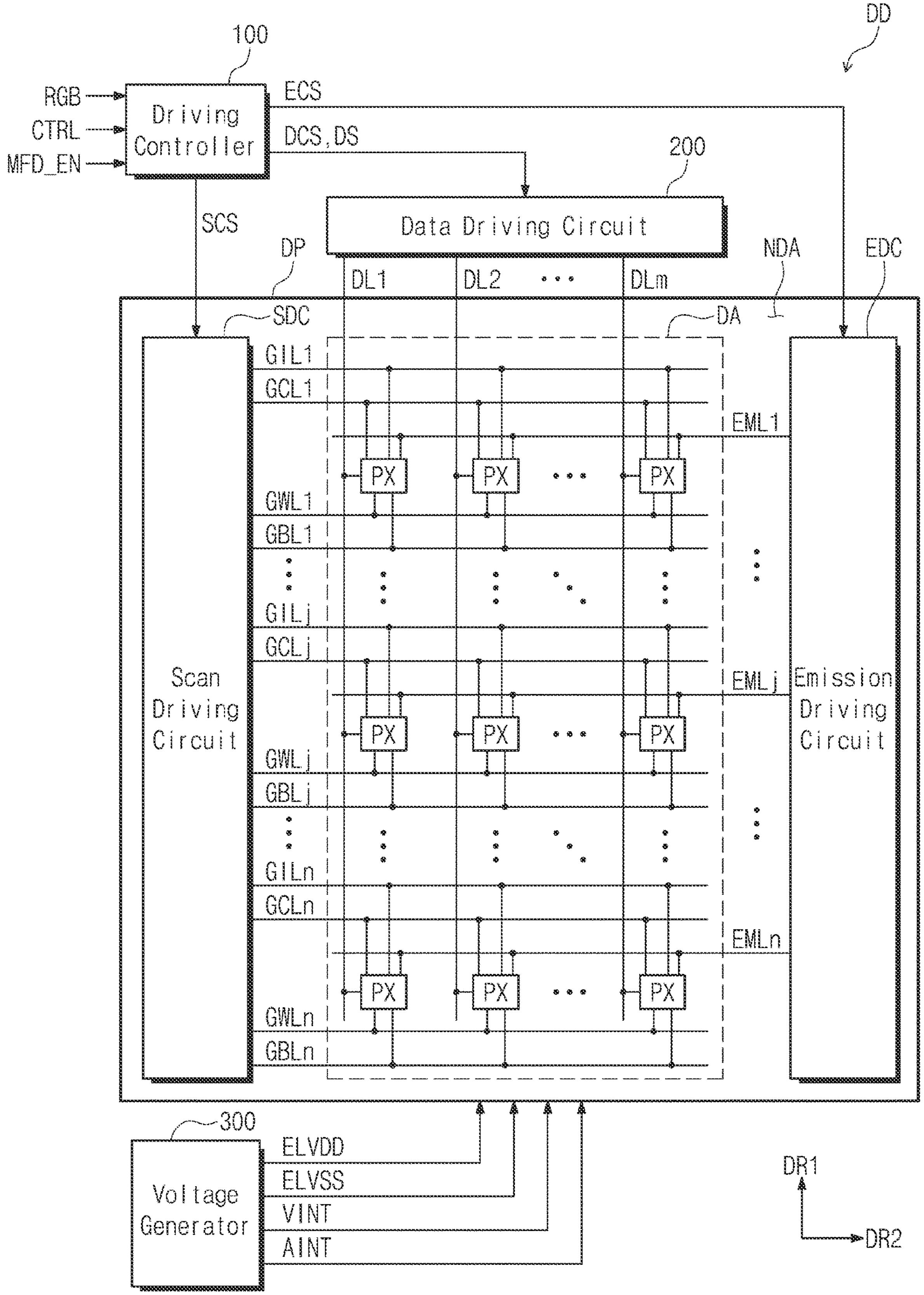
FIG. 5 is a block diagram of a display device, according to an embodiment of the present disclosure.

FIG. 5 is a block diagram of a display device according to an embodiment of the present disclosure.

Referring to FIG. 5, the display device DD includes the display panel DP, a driving controller 100, a data driving circuit 200, a scan driving circuit SDC, an emission driving circuit EDC, and a voltage generator 300. The driving controller 100 may be defined as a timing controller.

The display panel DP may include a plurality of scan lines GIL1 to GILn, GCL1 to GCLn, GWL1 to GWLn, and GBL1 to GBLn, a plurality of emission lines EML1 to EMLn, a plurality of data lines DL1 to DLm, and a plurality of pixels PX. 'n' and 'm' may be natural numbers.

An area of the display panel DP may include the display area DA and the non-display area NDA surrounding the display area DA in a plan view. The pixels PX may be positioned in the display area DA. The pixels PX may be electrically connected to the scan lines GIL1 to GILn, GCL1 to GCLn, GWL1 to GWLn, and GBL1 to GBLn, the emission lines EML1 to EMLn, and the data lines DL1 to DLm.

Each of the plurality of pixels PX may be electrically connected to four corresponding scan lines and one corresponding emission line. For example, the pixels of the j-th row may be connected to the j-th scan lines GILj, GCLj, GWLj, and GBLj and the j-th emission line EMLj. 'j' may be a natural number.

The scan lines may include the plurality of initialization scan lines GIL1 to GILn, the plurality of compensation scan lines GCL1 to GCLn, the plurality of write scan lines GWL1 to GWLn, and the plurality of bias scan lines GBL1 to GBLn.

Each of the pixels PX may be connected to a corresponding one among the initialization scan lines GIL1 to GILn, a corresponding one among the compensation scan lines GCL1 to GCLn, a corresponding one among the write scan lines GWL1 to GWLn, and a corresponding one among the bias scan lines GBL1 to GBLn.

The scan driving circuit SDC may be positioned on a first side of the display panel DP. The scan lines GIL1 to GILn, GCL1 to GCLn, GWL1 to GWLn, and GBL1 to GBLn may extend from the scan driving circuit SDC in the second direction DR2.

The emission driving circuit EDC may be positioned on a second side of the display panel DP. The emission lines EML1 to EMLn may extend from the emission driving circuit EDC in a direction opposite to the second direction DR2.

In the example shown in FIG. 5, the scan driving circuit SDC and the emission driving circuit EDC are positioned to face each other with the pixels PX interposed therebetween, but the present disclosure is not limited thereto. For example, the scan driving circuit SDC and the emission driving circuit EDC may be positioned adjacent to each other on one of the first side and the second side of the display panel DP. In an embodiment, the scan driving circuit SDC and the emission driving circuit EDC may be implemented in one circuit.

The scan lines GIL1 to GILn, GCL1 to GCLn, GWL1 to GWLn, and GBL1 to GBLn, and the emission lines EML1 to EMLn may be spaced apart from each other in the first direction DR1. The data lines DL1 to DLm may extend from the data driving circuit 200 in a direction opposite to the first direction DR1 and may be spaced apart from each other in the second direction DR2.

The driving controller 100 may receive an image signal RGB, a control signal CTRL, and a mode signal MFD_EN. The driving controller 100 may generate an image data signal DS by converting a data format of the image signal RGB so as to be suitable for the interface specification of the data driving circuit 200. The driving controller 100 may output a scan control signal SCS, a data control signal DCS, and an emission control signal ECS in response to the control signal CTRL.

The data driving circuit 200 may receive the data control signal DCS and the image data signal DS from the driving controller 100. The data driving circuit 200 may convert the image data signal DS into data signals and may output the converted data signals. The data signals may be defined as analog voltages corresponding to the gray level of the image data signal DS. The data signals may be applied to the pixels PX through the data lines DL1 to DLm.

The voltage generator 300 may generate voltages necessary to operate the display panel DP. The voltage generator 300 may generate a first driving voltage ELVDD, a second driving voltage ELVSS, a first initialization voltage VINT, and a second initialization voltage AINT. The first driving voltage ELVDD, the second driving voltage ELVSS, the first initialization voltage VINT, and the second initialization voltage AINT may be applied to the pixels PX.

The scan driving circuit SDC may receive the scan control signal SCS from the driving controller 100. The scan driving circuit SDC may output scan signals to the scan lines GIL1 to GILn, GCL1 to GCLn, GWL1 to GWLn, and GBL1 to GBLn in response to the scan control signal SCS. The scan signals may be applied to the pixels PX through the scan lines GIL1 to GILn, GCL1 to GCLn, GWL1 to GWLn, and GBL1 to GBLn.

The emission driving circuit EDC may receive the emission control signal ECS from the driving controller 100. The emission driving circuit EDC may output emission signals to the emission lines EML1 to EMLn in response to the emission control signal ECS. The emission signals may be applied to the pixels PX through the emission lines EML1 to EMLn.

The driving controller 100 may determine an operating mode in response to the mode signal MFD_EN. In an embodiment, the mode signal MFD_EN may indicate whether the operating mode is a normal mode or a low-frequency mode. In an embodiment, the mode signal MFD_EN may be provided from a host processor (e.g., a graphics processor or an application processor).

When the operating mode is the normal mode, the driving controller 100 may drive the display panel DP at a first operating frequency. When the operating mode is the low-frequency mode, the driving controller 100 may drive the display panel DP at a second operating frequency.

When the operating mode is the low-frequency mode, the driving controller 100 may change a clock signal applied to the scan driving circuit from alternating current (AC) to direct current (DC). Hereinafter, this operation will be described in detail.

The pixels PX may receive the data voltages in response to the scan signals. The pixels PX may display an image by emitting light of luminance corresponding to the data voltages in response to the emission signals.

Figure 6:
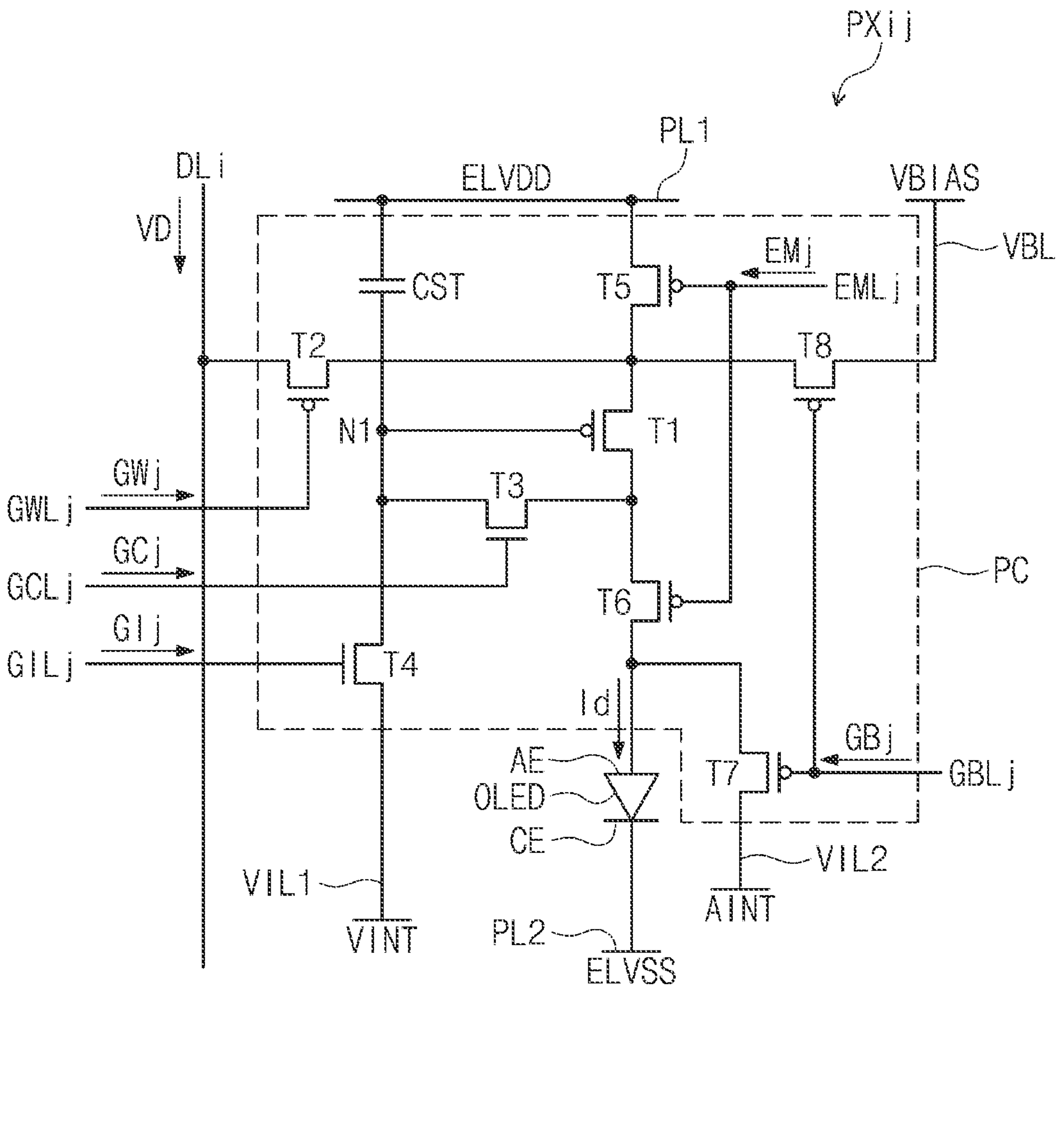
FIG. 6 is a diagram showing an equivalent circuit of one pixel among the pixels shown in FIG. 5.

FIG. 6 is a diagram showing an equivalent circuit of one pixel among the pixels shown in FIG. 5.

FIG. 6 illustrates a pixel PXij connected to the i-th data line DLi, the j-th scan lines GWLj, GCLj, GILj, and GBLj, and the j-th emission line EMLj. Each of 'i' and 'j' may be a natural number.

Referring to FIG. 6, the pixel PXij may include a pixel circuit PC and a light emitting element OLED connected to the pixel circuit PC. The pixel circuit PC may drive the light emitting element OLED.

The pixel circuit PC may include a plurality of transistors T1 to T8 and a capacitor CST. The transistors T1 to T8 and the capacitor CST may control the amount of current flowing through the light emitting element OLED. The light emitting element OLED may generate light having predetermined luminance depending on the amount of current supplied thereto.

The j-th write scan line GWLi may receive a j-th write scan signal GWj. The j-th compensation scan line GCLj may receive a j-th compensation scan signal GCj. The j-th initialization scan line GILj may receive a j-th initialization scan signal GIj. The j-th bias scan line GBLj may receive a j-th bias scan signal GBj. The j-th emission line EMLj may receive a j-th emission signal EMj.

The pixel PXij may be connected to the i-th data line DLi, the j-th write scan line GWLi, the j-th compensation scan line GCLj, the j-th initialization scan line GILj, the j-th bias scan line GBLj, the j-th emission line EMLj, a first initialization line VIL1, a second initialization line VIL2, a bias line VBL, and first and second power supply lines PL1 and PL2.

The first initialization line VIL1 may supply the first initialization voltage VINT. The second initialization line VIL2 may supply the second initialization voltage AINT. The bias line VBL may supply a bias voltage VBIAS. The first power supply line PL1 may supply the first driving voltage ELVDD. The second power supply line PL2 may supply the second driving voltage ELVSS.

Each of the transistors T1 to T8 may include a source electrode, a drain electrode, and a gate electrode. Hereinafter, for convenience of description, in FIG. 5, one of the source electrode and the drain electrode is defined as the first electrode, and the other thereof is defined as the second electrode. Also, the gate electrode is defined as a control electrode.

The transistors T1 to T8 may include the first to eighth transistors T1 to T8. The first, second, and fifth to eighth transistors T1, T2, and T5 to T8 may be PMOS transistors. The third and fourth transistors T3 and T4 may be NMOS transistors.

The first transistor T1 may be defined as a driving transistor. The second transistor T2 may be defined as a switching transistor. The third transistor T3 may be defined as a compensation transistor. The fourth transistor T4 and the seventh transistor T7 may be defined as initialization transistors. The fifth transistor T5 and the sixth transistor T6 may be defined as emission control transistors. The eighth transistor T8 may be defined as a bias transistor.

The light emitting element OLED may be an organic light emitting element. The light emitting element OLED may include an anode AE and a cathode CE. The anode AE may receive the first driving voltage ELVDD through the sixth, first, and fifth transistors T6, T1, and T5. The first driving voltage ELVDD may be applied to the pixel circuit PC through the first power supply line PL1.

The cathode CE may receive the second driving voltage ELVSS having a lower level than the first driving voltage ELVDD. The second driving voltage ELVSS may be applied to the pixel circuit PC through the second power supply line PL2.

The first transistor T1 may be interposed between the fifth transistor T5 and the sixth transistor T6 and connected to the fifth transistor T5 and the sixth transistor T6. The first transistor T1 may be connected to the first power supply line PL1 through the fifth transistor T5 and may be connected to the anode AE through the sixth transistor T6.

The first transistor T1 may include a first electrode connected to the first power supply line PL1 through the fifth transistor T5, a second electrode connected to the anode AE through the sixth transistor T6, and a control electrode connected to a first node N1.

The first electrode of the first transistor T1 may be connected to the fifth transistor T5. The second electrode of the first transistor T1 may be connected to the sixth transistor T6. The first transistor T1 may control the amount of current flowing through the light emitting element OLED depending on the voltage of the first node N1 applied to the control electrode of the first transistor T1.

The second transistor T2 may be interposed between the first transistor T1 and the i-th data line DLi and connected to the first transistor T1 and the i-th data line DLi. The second transistor T2 may include a first electrode connected to the i-th data line DLi, a second electrode connected to the first electrode of the first transistor T1, and a control electrode connected to the j-th write scan line GWLi.

The second transistor T2 may be turned on in response to the j-th write scan signal GWj received through the j-th write scan line GWLi to electrically connect the i-th data line DLi and the first electrode of the first transistor T1. The second transistor T2 may perform a switching operation to provide a data voltage VD (corresponding to the data signal described above) supplied from the i-th data line DLi to the first electrode of the first transistor T1.

The third transistor T3 may be interposed between the second electrode of the first transistor T1 and the first node N1. The third transistor T3 may include a first electrode connected to the second electrode of the first transistor T1, a second electrode connected to the first node N1, and a control electrode connected to the j-th compensation scan line GCLj.

The third transistor T3 may be turned on in response to the j-th compensation scan signal GCj supplied from the j-th compensation scan line GCLj to electrically connect the second electrode of the first transistor T1 and the control electrode of the first transistor T1. When the third transistor T3 is turned on, the first transistor T1 may be diode-connected.

The fourth transistor T4 may be connected to the first node N1. The fourth transistor T4 may include a first electrode connected to the first node N1, a second electrode connected to the first initialization line VIL1, and a control electrode connected to the j-th initialization scan line GILj. The fourth transistor T4 may be turned on in response to the j-th initialization scan signal GIj supplied from the j-th initialization scan line GILj to provide the first initialization voltage VINT supplied from the first initialization line VIL1 to the first node N1.

The fifth transistor T5 may include a first electrode connected to the first power supply line PL1, a second electrode connected to the first electrode of the first transistor T1, and a control electrode connected to the j-th emission line EMLj.

The sixth transistor T6 may include a first electrode connected to the second electrode of the first transistor T1, a second electrode connected to the anode AE, and a control electrode connected to the j-th emission line EMLj.

The fifth transistor T5 and the sixth transistor T6 may be turned on in response to the j-th emission signal EMj supplied from the j-th emission line EMLj. The first driving voltage ELVDD may be provided to the light emitting element OLED by the turned-on fifth transistor T5 and the turned-on sixth transistor T6 such that a driving current is capable of flowing through the light emitting element OLED. Accordingly, the light emitting element OLED may emit light.

The seventh transistor T7 may include a first electrode connected to the anode AE, a second electrode connected to the second initialization line VIL2, and a control electrode connected to the j-th bias scan line GBLj. The seventh transistor T7 is turned on in response to the j-th bias scan signal GBj supplied from the j-th bias scan line GBLj to provide the second initialization voltage AINT received from the second initialization line VIL2 to the anode AE of the light emitting element OLED.

In an embodiment of the present disclosure, the seventh transistor T7 may be omitted. In an embodiment of the present disclosure, the second initialization voltage AINT may have a different level from the first initialization voltage VINT, but is not limited thereto. For example, the second initialization voltage AINT may have the same level as the first initialization voltage VINT.

The seventh transistor T7 may improve the black expression capability of the pixel PX. When the seventh transistor T7 is turned on, a parasitic capacitor (not shown) of the light emitting element OLED may be discharged. When black luminance is implemented, the light emitting element OLED may not emit light due to a leakage current from the first transistor T1, thereby improving black expression capability.

The capacitor CST may include a first electrode connected to the first power supply line PL1 and a second electrode connected to the first node N1. When the fifth transistor T5 and the sixth transistor T6 are turned on, the amount of current flowing through the first transistor T1 may be determined depending on the voltage stored in the capacitor CST.

The eighth transistor T8 may include a first electrode connected to the bias line VBL, a second electrode connected to the first electrode of the first transistor T1, and a control electrode connected to the j-th bias scan line GBLj.

The eighth transistor T8 may be turned on in response to the j-th bias scan signal GBj to provide the bias voltage VBIAS to the first electrode of the first transistor T1.

Figure 7:
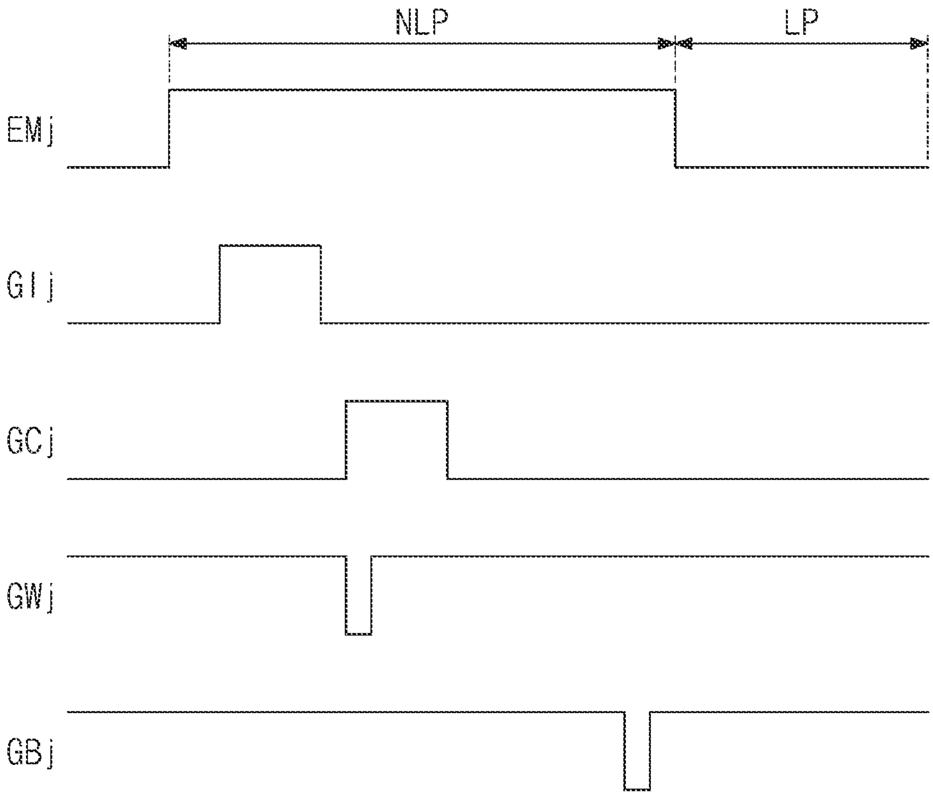
FIG. 7 is a timing diagram of scan signals and an emission signal for describing an operation of the pixel shown in FIG. 6.

FIG. 7 is a timing diagram of scan signals and an emission signal for describing an operation of the pixel shown in FIG. 6.

Referring to FIGS. 6 and 7, the j-th emission signal EMj may have a high level during a non-emission period NLP and a low level during an emission period LP.

An active period of each of the j-th write scan signal GWj and the j-th bias scan signal GBj may be defined as being at a low level of each of the j-th write scan signal GWj and the j-th bias scan signal GBj.

An active period of each of the j-th compensation scan signal GCj and the j-th initialization scan signal GIj may be defined as being at a high level of each of the j-th compensation scan signal GCj and the j-th initialization scan signal GIj.

After the j-th initialization scan signal GIj is activated, the j-th compensation scan signal GCj and the j-th write scan signal GWj may be activated. Afterward, the j-th bias scan signal GBj may be activated.

During the non-emission period NLP, the j-th initialization scan signal GIj, the j-th compensation scan signal GCj, the j-th write scan signal GWj, and the j-th bias scan signal GBj, which are activated, may be applied to the pixel PXij.

The j-th initialization scan signal GIj may be applied to the fourth transistor T4 such that the fourth transistor T4 is turned on. The first initialization voltage VINT may be provided to the node N1 through the fourth transistor T4. Accordingly, the first initialization voltage VINT may be applied to the control electrode of the first transistor T1, and the first transistor T1 may be initialized by the first initialization voltage VINT. This operation may be defined as an initialization operation.

The j-th write scan signal GWj may be applied to the second transistor T2 such that the second transistor T2 is turned on. Furthermore, the j-th compensation scan signal GCj may be applied to the third transistor T3 such that the third transistor T3 is turned on.

The first transistor T1 may be diode-connected. In this case, a compensation voltage "VD-Vth", which is obtained by reducing the data voltage VD supplied through the data line DLi by a threshold voltage Vth of the first transistor T1, may be applied to the control electrode of the first transistor T1. This operation may be defined as a write operation (or programming operation) and a compensation operation.

The first voltage ELVDD and compensation voltage "VD-Vth" may be applied to a first electrode of the capacitor CST and a second electrode of the capacitor CST, respectively. Charges corresponding to a difference between a voltage of the first electrode of the capacitor CST and a voltage of the second electrode of the capacitor CST may be stored in the capacitor CST.

Afterward, the j-th bias scan signal GBj may be applied to the seventh and eighth transistors T7 and T8 such that the seventh and eighth transistors T7 and T8 are turned on. The second initialization voltage AINT may be provided to the anode AE through the seventh transistor T7, and thus the anode AE may be initialized to the second initialization voltage AINT. The bias voltage VBIAS may be applied to the first electrode of the first transistor T1 through the eighth transistor T8.

Afterward, during the emission period LP, the i-th emission signal EMj may be applied to the fifth transistor T5 and the sixth transistor T6 through the j-th emission line EMLj such that the fifth transistor T5 and the sixth transistor T6 are turned on. In this case, a driving current Id corresponding to a voltage difference between the voltage of the control electrode of the first transistor T1 and the first voltage ELVDD may be generated. The driving current Id may be provided to the light emitting element OLED through the sixth transistor T6, and thus the light emitting element OLED may emit light.

During the emission period LP, a gate-source voltage Vgs of the first transistor T1 may be "Vgs=ELVDD−(VD−Vth)".

An equation of a relationship between a current and a voltage of the first transistor T1 may be defined as "$Id=(1/2)\mu Cox(W/L)(Vgs-Vth)^2$". This equation refers to an equation of a relationship between a current and a voltage of a typical transistor.

When Vgs is substituted into the equation of a relationship between a current and a voltage, the threshold voltage Vth may be removed, and the driving current Id may be proportional to a square value "$(ELVDD-VD)^2$" of a value obtained by subtracting the data voltage VD from the first voltage ELVDD. Accordingly, the driving current Id may be determined regardless of the threshold voltage Vth of the first transistor T1. This operation may be defined as a threshold voltage compensation operation.

Before the light emitting element OLED emits light after the threshold voltage of the first transistor T1 is compensated for, the bias voltage VBIAS may be applied to the first electrode of the first transistor T1 through the eighth transistor T8. The shift of a hysteresis curve of the first transistor T1 may be suppressed by the bias voltage VBIAS. This operation may be defined as a bias operation.

Figure 8:
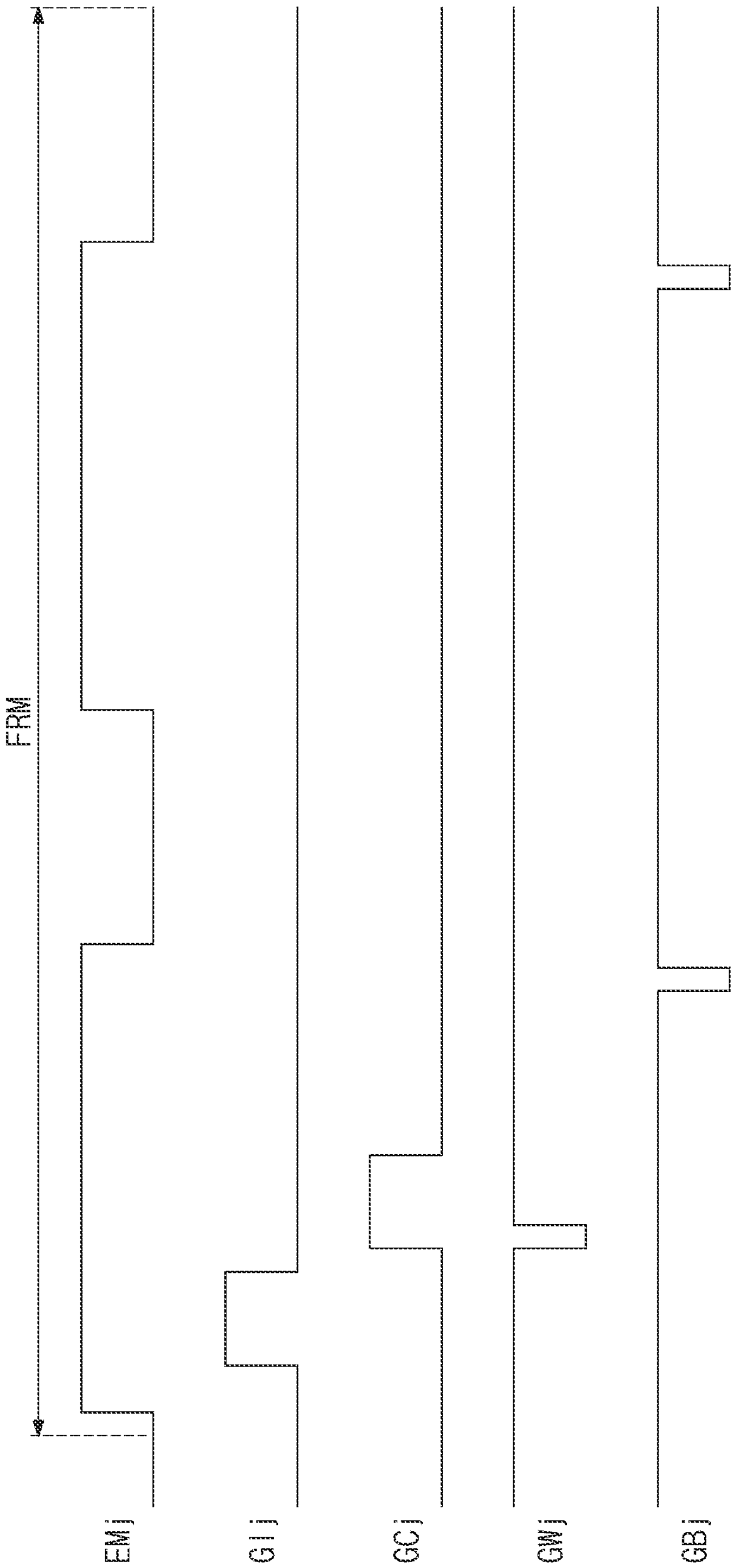
FIG. 8 is a diagram illustrating timings of scan signals and an emission signal applied to a pixel in a frame.

FIG. 8 is a diagram illustrating timings of scan signals and an emission signal applied to a pixel in a frame.

A frame FRM shown in FIG. 8 may indicate one of frames in which a data signal is written to the pixel PXij.

Referring to FIGS. 6, 7, and 8, during the frame FRM, the j-th initialization scan signal GIj, the j-th compensation scan signal GCj, and the j-th write scan signal GWj may be provided to the pixel PXij only once. Accordingly, each of an initialization operation, a write operation, and a compensation operation may be performed once.

However, the j-th bias scan signal GBj may be provided to the pixel PXij multiple times. To this end, the j-th emission signal EMj having a high level may be provided to the pixel PXij multiple times. Accordingly, a bias operation may be performed multiple times.

For example, the j-th bias scan signal GBj and the j-th emission signal EMj are provided to the pixel PXij twice during the one frame FRM, but embodiments of the present disclosure are not limited thereto.

For example, like the other scan signals GIj, GCj, and GWj, the j-th bias scan signal GBj and the j-th emission signal EMj may be provided to the pixel PXij only once during the one frame FRM. Moreover, the j-th bias scan signal GBj and the j-th emission signal EMj may be provided to the pixel PXij during the frame FRM twice or more.

Hereinafter, an operation in which the j-th bias scan signal GBj and the j-th emission signal EMj are provided to the pixel PXij twice during the one frame FRM will be described.

Figure 9:
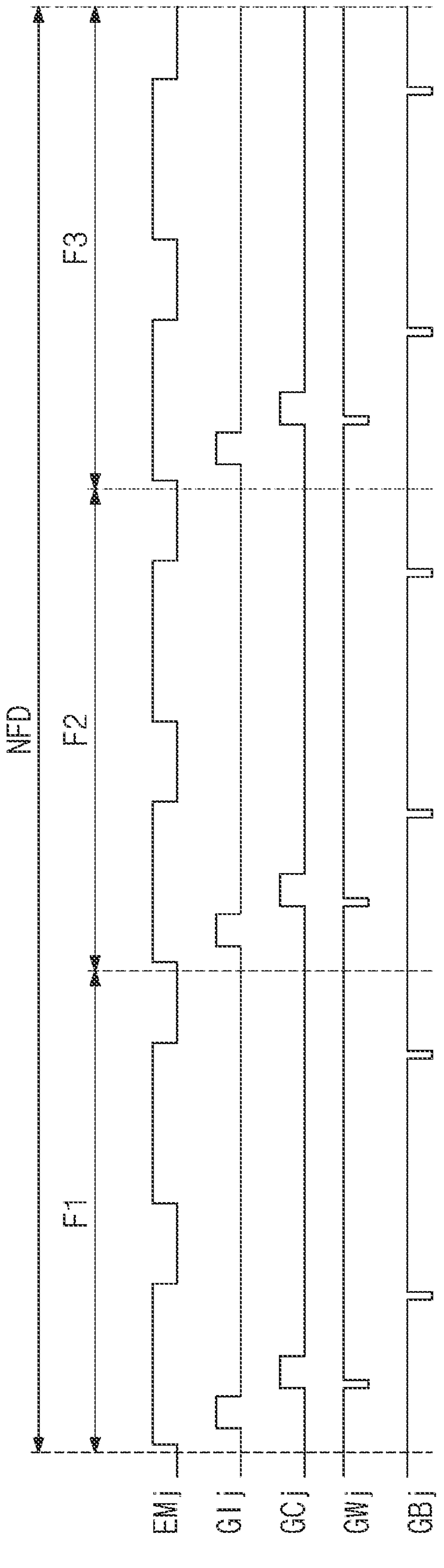
FIG. 9 is a timing diagram of scan signals and an emission signal when the pixel shown in FIG. 6 is operated in a normal mode.

FIG. 9 is a timing diagram of scan signals and an emission signal when the pixel shown in FIG. 6 is operated in a normal mode.

Hereinafter, an operation in which the scan signals GIj, GCj, GWj, and GBj are applied to the pixel PXij is defined as an activated operation. An operation in which the scan signals GIj, GCj, GWj, and GBj are not applied to the pixel PXij is defined as a deactivated operation.

Referring to FIG. 9, during the normal mode NFD, during each of the first, second, and third frames F1, F2, and F3, the scan signals GIj, GCj, GWj, and GBj may be applied to the pixel PXij, and thus the pixel PXij may be driven. Although not shown in drawings, the scan signals GIj, GCj, GWj, and GBj may be applied to the pixel PXij until the 120th frame F120 of the normal mode NFD described above, and thus the pixel PXij may be driven. Accordingly, during the first to 120th frames F1 to F120, images may be updated to display a video.

Figure 10:
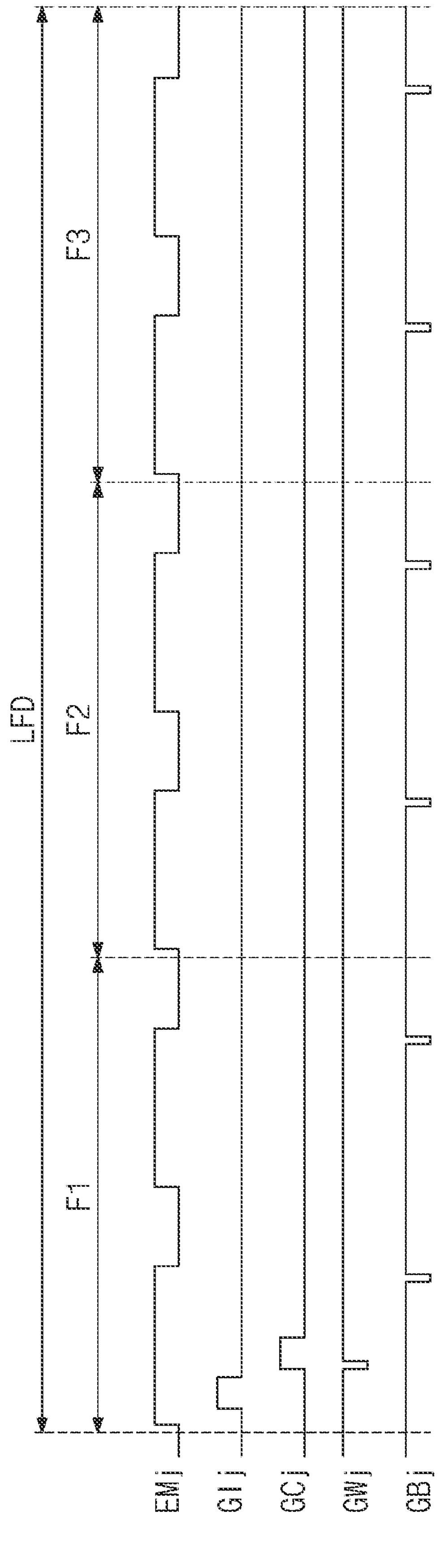
FIG. 10 is a timing diagram of scan signals and an emission signal when the pixel shown in FIG. 6 is operated in a low-frequency mode.

FIG. 10 is a timing diagram of scan signals and an emission signal when the pixel shown in FIG. 6 is operated in a low-frequency mode.

Referring to FIG. 10, in the low-frequency mode, the scan signals GIj, GCj, GWj, and GBj are applied to the pixel PXij during the first frame F1 such that the pixel PXij is driven. During the first frame F1, the data voltage VD may be applied to the pixel PXij in response to the write scan signal GWj.

During the second frame F2 and the third frame F3, an image may not be updated and the previous image may be displayed. During the second and third frames F2 and F3, the j-th initialization scan signal GIj, the j-th compensation scan signal GCj, and the j-th write scan signal GWj may not be applied to the pixel PXij.

Although not shown in drawings, the image may not be updated until the 120th frame F120 of the low-frequency mode LFD described above, and the previous image may be displayed. Accordingly, from the second to 120th frames F2 to F120, the j-th initialization scan signal GIj, the j-th compensation scan signal GCj, and the j-th write scan signal GWj may not be applied to the pixel PXij.

In the same way as the first frame F1, the emission signal EMj may be applied to the pixel PXij during the second to 120th frames F2 to F120. Even when the data voltage VD is not applied to the pixel PXij during the second to 120th frames F2 to F120, the light emitting element OLED may emit due to charges that is stored in the capacitor CST.

In the same way as the first frame F1, the j-th bias scan signal GBj may be applied to the pixel PXij during the second to 120th frames F2 to F120. Accordingly, during the second to 120th frames F2 to F120, the bias voltage VBIAS may be applied to the first electrode of the first transistor T1.

A state of the first transistor T1 may be changed to an on-bias state by the bias voltage VBIAS. In this case, a variation in hysteresis characteristics of the first transistor T1 for displaying a still image is reduced, such that the hysteresis characteristics of the first transistor T1 may be kept constant.

Figure 11:
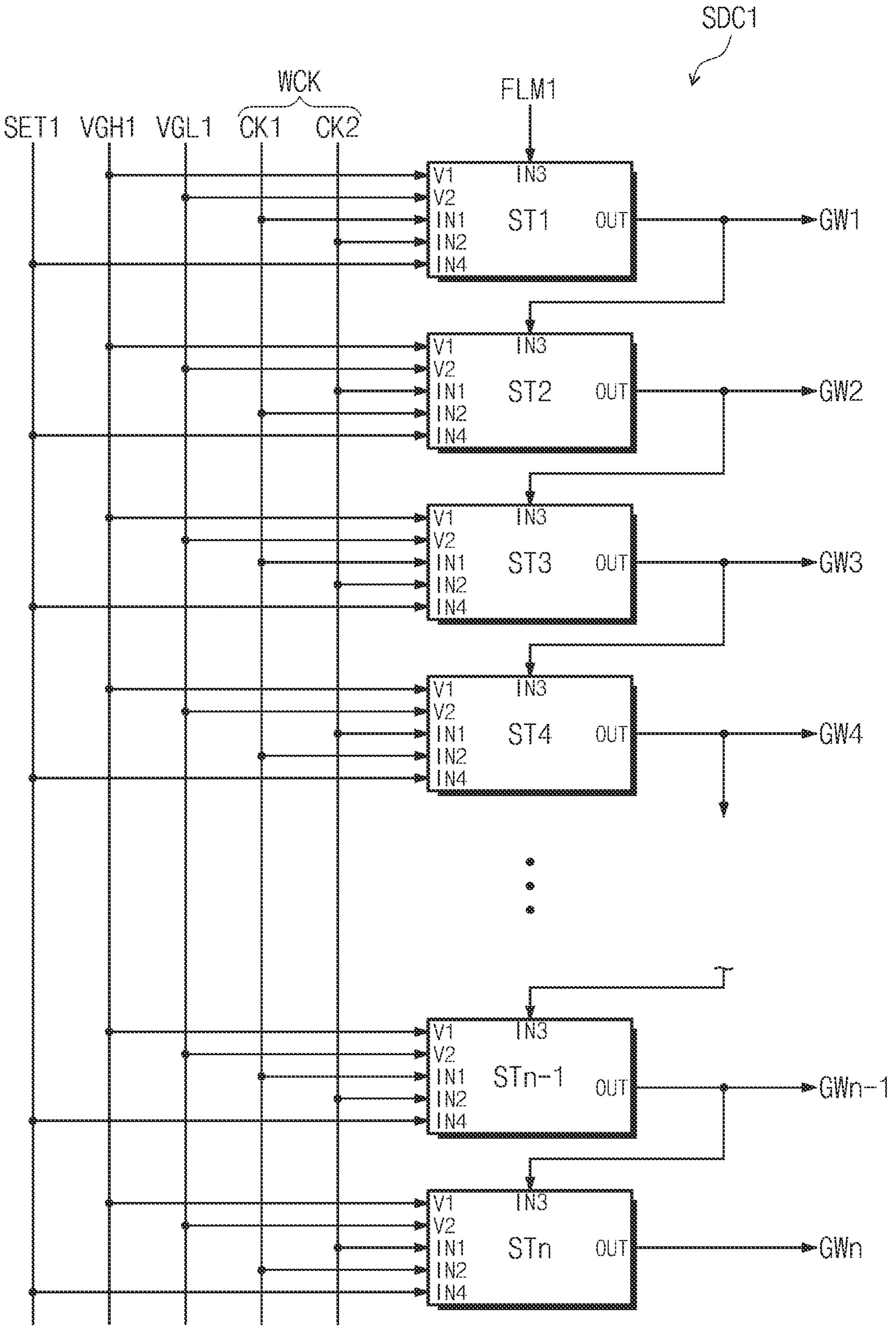
FIG. 11 is a block diagram of a first scan driving circuit of the scan driving circuit shown in FIG. 5.

FIG. 11 is a block diagram of a first scan driving circuit of the scan driving circuit shown in FIG. 5.

Referring to FIGS. 5 and 11, the scan driving circuit SDC may include a first scan driving circuit SDC1. The first scan driving circuit SDC1 may include a plurality of stages ST1 to STn that are continuously connected in a sequential manner. The stages ST1 to STn may generate and output write scan signals GW1 to GWn, respectively. The write scan signals GW1 to GWn may be output through the write scan lines GWL1 to GWLn shown in FIG. 5, respectively.

The stages ST1 to STn may receive a first start signal FLM1 or a write scan signal output from the previous stage, a write clock signal WCK, a first set signal SET1, a first high voltage VGH1, and a first low voltage VGL1. The above-described scan control signal SCS may include the first start signal FLM1, the write clock signal WCK, and the first set signal SET1. The first high voltage VGH1 and the first low voltage VGL1 may be generated by the voltage generator 300 and may be provided to the first scan driving circuit SDC1. The first low voltage VGL1 may have a lower level than the first high voltage VGH1.

The stages ST1 to STn may include first to fourth input terminals IN1 to IN4, first and second voltage terminals V1 and V2, and an output terminal OUT. The stages ST1 to STn may receive the first start signal FLM1 or the write scan signal output from the previous stage, the write clock signal WCK, the first set signal SET1, the first high voltage VGH1, and the first low voltage VGL1 through the first to fourth input terminals IN1 to IN4 and the first and second voltage terminals V1 and V2. The stages ST1 to STn may output the write scan signals GW1 to GWn through the output terminals OUT.

The stages ST1 to STn may receive the write clock signal WCK through the first and second input terminals IN1 and IN2. The write clock signal WCK may include a first clock signal CK1 and a second clock signal CK2 having a phase opposite to a phase of the first clock signal CK1.

The first clock signal CK1 and the second clock signal CK2 may be alternately applied to the first and second input terminals IN1 and IN2 of each of the stages ST1 to STn. For example, the first clock signal CK1 may be applied to the first input terminals IN1 of the odd numbered stages (ST1, ST3, . . . , STn−1), and the second clock signal CK2 may be applied to the second input terminals IN2 of the odd numbered stages (ST1,ST3, . . . , STn−1).

The second clock signal CK2 may be applied to the first input terminals IN1 of the even numbered stages (ST2, ST4, . . . , STn), and the first clock signal CK1 may be applied to the second input terminals IN2 of the even numbered stages (ST2,ST4, . . . , STn).

The first stage ST1 among the stages ST1 to STn may receive the first start signal FLM1 through the third input terminal IN3. In the second to n-th stages ST2 to STn, the current stage may receive a write scan signal output from the previous stage through the third input terminal IN3.

The stages ST1 to STn may receive the first high voltage VGH1 through the first voltage terminals V1. The stages ST1 to STn may receive the first low voltage VGL1 through the second voltage terminals V2.

The first stage ST1 may be activated in response to the first start signal FLM1. In the second to n-th stages ST2 to STn, the current stage may be activated in response to the write scan signal output from the previous stage.

The activated stages ST1 to STn may apply the write scan signals GW1 to GWn to the pixels PX in response to the write clock signal WCK. The activated stages ST1 to STn may output the write scan signals GW1 to GWn by using the first and second clock signals CK1 and CK2, the first high voltage VGH1, and the first low voltage VGL1.

In the normal mode NFD, each of the stages ST1 to STn may output a write scan signal having a first operating frequency. In the low-frequency mode LFD, each of the stages ST1 to STn may output a write scan signal having a second operating frequency. In the low-frequency mode LFD, the stages ST1 to STn may output the deactivated write scan signals GW1 to GWn in response to the first set signal SET1. Hereinafter, this operation will be described in detail.

Figure 12:
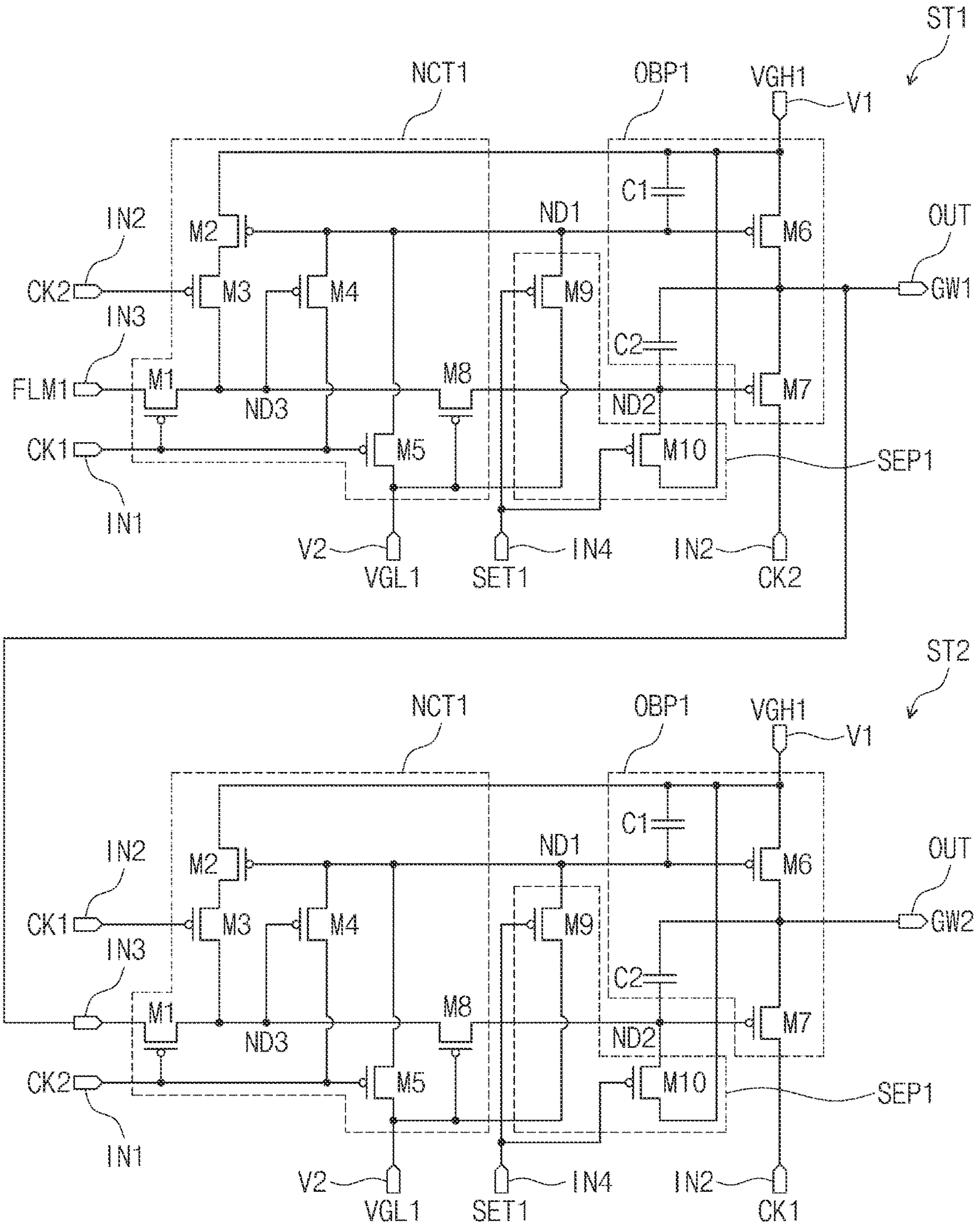
FIG. 12 is a diagram showing a circuit configuration of the first and second stages shown in FIG. 11.

FIG. 12 is a diagram showing a circuit configuration of the first and second stages shown in FIG. 11.

Although not shown in drawings, each of other stages ST3 to STn may have the same configuration as the first stage ST1 or the second stage ST2 shown in FIG. 12. The first stage ST1 and the second stage ST2 have substantially the same configuration, and thus, a configuration of the first stage ST1 will be described below.

Referring to FIG. 12, the first stage ST1 may include a first node controller NCT1, a first output buffer part OBP1, and a first set part SEP1.

The first node controller NCT1 may be connected to a first node ND1 and a second node ND2. The first node controller NCT1 may receive the first high voltage VGH1, the first low voltage VGL1, a first start signal FLM1, the first clock signal CK1, and the second clock signal CK2. The first node controller NCT1 may control a voltage level of the first node ND1 and a voltage level of the second node ND2 in response to the first high voltage VGH1, the first low voltage VGL1, the first start signal FLM1, the first clock signal CK1, and the second clock signal CK2.

The first output buffer part OBP1 may be connected to the first node ND1 and the second node ND2. The first output buffer part OBP1 may receive the first high voltage VGH1 and the second clock signal CK2. The first output buffer part OBP1 may output the write scan signal GW1 depending on the voltage levels of the first and second nodes ND1 and ND2.

The first output buffer part OBP1 may output one of the first high voltage VGH1 and the second clock signal CK2 depending on the voltage of the first node and the second node ND2.

Figure 13:
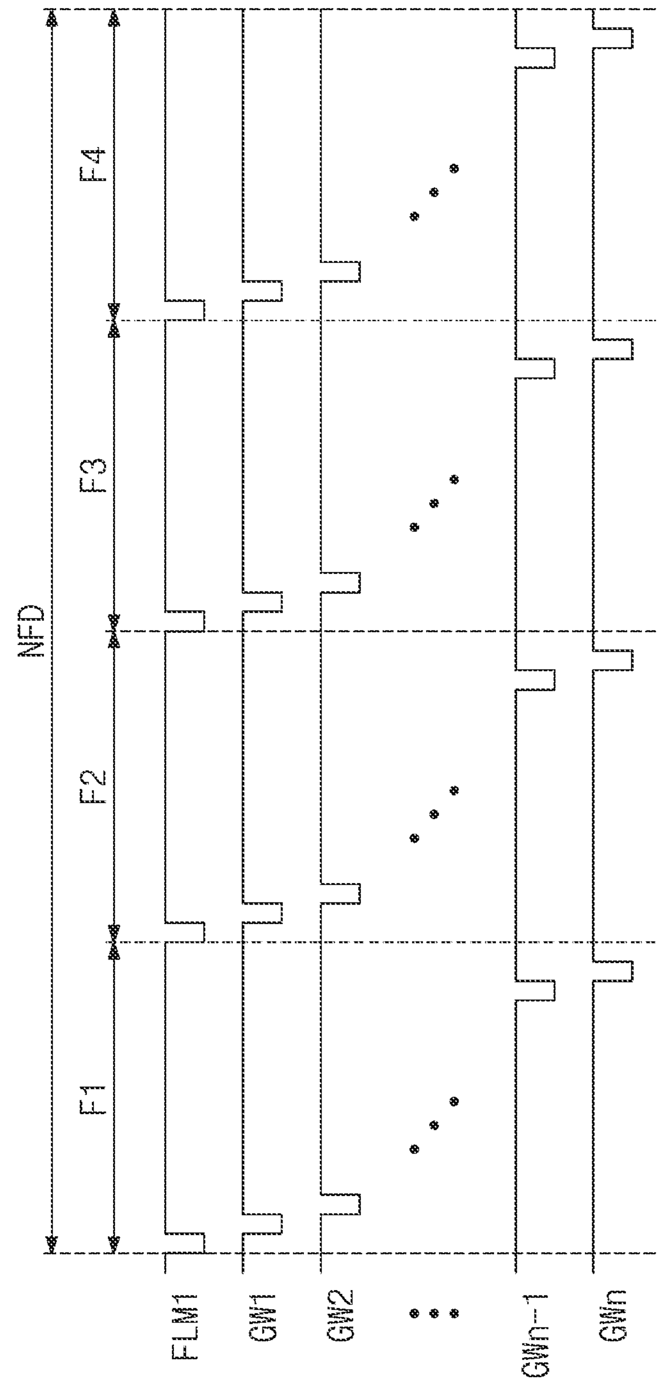
FIG. 13 is a diagram illustrating timings of write scan signals output from the stages shown in FIG. 11 in a normal mode.

The first output buffer part OBP1 may output the write scan signal GW1 which includes the second clock signal CK2 depending on the voltages of the first and second nodes ND1 and ND2. For example, the write scan signal GW1 may be a single pulse signal (as shown in FIG. 13) which transitions to a low level once per one frame in response to the low level of the second clock signal CK2. Accordingly, the first stage ST1 may output the write scan signal GW1 in response to the second clock signal CK2 of the write clock signal WCK.

In the second stage ST2, the first clock signal CK1 may be applied to the second input terminal IN2, and the second clock signal CK2 may be applied to the first input terminal IN1. Accordingly, the second stage ST2 may output the write scan signal GW2 in response to the first clock signal CK1 of the write clock signal WCK.

The activated write scan signal GW1 may have a low level. The deactivated write scan signal GW1 may have a high level. The write scan signal GW1 output from the first output buffer part OBP1 may be provided to the third input terminal IN3 of the second stage ST2. The second stage ST2 may operate to output the write scan signal GW2 in response to the write scan signal GW1 output from the first stage ST1, which is the previous stage.

The first set part SEP1 may be connected to the first node ND1 and the second node ND2. The first set part SEP1 may receive the first set signal SET1. In response to the first set signal SET1, the first set part SEP1 may set the voltage of the first node ND1 to the first low voltage VGL1, and may set the voltage of the second node ND2 to the first high voltage VGH1. In this case, the first output buffer part OBP1 may stably output the deactivated write scan signal GW1.

For the above-mentioned operation, the first node controller NCT1 may include first, second, third, fourth, fifth, and eighth transistors M1, M2, M3, M4, M5, and M8. For the above-mentioned operation, the first output buffer part OBP1 may include sixth and seventh transistors M6 and M7 and first and second capacitors C1 and C2. For the above-mentioned operation, the first set part SEP1 may include ninth and tenth transistors M9 and M10.

The first to tenth transistors M1 to M10 may be PMOS transistors, but are not limited thereto. For example, the first to tenth transistors M1 to M10 may be NMOS transistors. The first to tenth transistors M1 to M10 may be defined as switching elements.

Each of the first to tenth transistors M1 to M10 may include a source electrode, a drain electrode, and a gate electrode. Hereinafter, for convenience of description, one of the source electrode and the drain electrode is defined as the first electrode, and the other thereof is defined as the second electrode. Also, the gate electrode is defined as a control electrode.

The first transistor M1 may include a first electrode connected to the third input terminal IN3, a second electrode connected to a third node ND3, and a control electrode connected to the first input terminal IN1. The third node ND3 may be connected to the second node ND2 through the eighth transistor M8.

The first transistor M1 may be switched in response to the first clock signal CK1 received through the first input terminal IN1. When the first clock signal CK1 is at a low level, the first transistor M1 may be turned on to apply the first start signal FLM1 received through the third input terminal IN3 to the third node ND3. The first start signal FLM1 may be a single pulse signal (shown in FIG. 13) transitioning to a low level once per one frame.

The second transistor M2 may include a first electrode receiving the first high voltage VGH1, a second electrode connected to the third transistor M3, and a control electrode connected to the first node ND1. The second transistor M2 may be connected to the third node ND3 through the third transistor M3. The second transistor M2 may be switched depending on the voltage of the first node ND1.

The third transistor M3 may include a first electrode connected to the second electrode of the second transistor M2, a second electrode connected to the third node ND3, and a control electrode connected to the second input terminal IN2. The third transistor M3 may be switched in response to the second clock signal CK2 received through the second input terminal IN2.

The second and third transistors M2 and M3 may be connected in series. When the second and third transistors M2 and M3 are turned on simultaneously, the first high voltage VGH1 may be applied to the third node ND3. Accordingly, the first to third transistors M1 to M3 may provide the third node ND3 with the first start signal FLM1 or the first high voltage VGH1 based on the first clock signal CK1 and the second clock signal CK2.

The fourth transistor M4 may include a first electrode connected to the first node ND1, a second electrode connected to the first input terminal IN1, and a control electrode connected to the third node ND3. The fourth transistor M4 may be switched depending on the voltage of the third node ND3. When the fourth transistor M4 is turned on, the fourth transistor M4 may apply the first clock signal CK1 received through the first input terminal IN1 to the first node ND1.

The fifth transistor M5 may include a first electrode connected to the first node ND1, a second electrode receiving the first low voltage VGL1, and a control electrode connected to the first input terminal IN1. The fifth transistor M5 may be switched in response to the first clock signal CK1 received through the first input terminal IN1. When the fifth transistor M5 is turned on, the fifth transistor M5 may apply the first low voltage VGL1 to the first node ND1.

Accordingly, the fourth and fifth transistors M4 and M5 may provide the first node ND1 with the first low voltage VGL1 or the first clock signal CK1 based on the first clock signal CK1 and the voltage level of the third node ND3.

The eighth transistor M8 may include a first electrode connected to the third node ND3, a second electrode connected to the second node ND2, and a control electrode receiving the first low voltage VGL1. The eighth transistor M8 may be turned on in response to the first low voltage VGL1. The eighth transistor M8 may be maintained in a turn-on state by the first low voltage VGL1. The eighth transistor M8 may connect the second node ND2 and the third node ND3.

The eighth transistor M8 may restrict a voltage drop range of the third node ND3. For example, even when the voltage of the second node ND2 drops to a voltage lower than the first low voltage VGL1, the voltage of the third node ND3 may not be lower than a voltage obtained by subtracting the threshold voltage of the eighth transistor M8 from the first low voltage VGL1. The eighth transistor M8 may be omitted.

The sixth transistor M6 may be defined as a pull-up switching element. The seventh transistor M7 may be defined as a pull-down switching element.

The sixth transistor M6 may include a first electrode receiving the first high voltage VGH1, a second electrode connected to the output terminal OUT, and a control electrode connected to the first node ND1. The sixth transistor M6 may be switched depending on the voltage level of the first node ND1. The sixth transistor M6 may be defined as a first buffer part. That is, the first buffer part may be connected to the first node ND1 and the output terminal OUT and may receive the first high voltage VGH1.

The sixth transistor M6 may determine the output of the first high voltage VGH1 depending on the voltage of the first node ND1. For example, when the sixth transistor M6 is turned on, the sixth transistor M6 may provide the first high voltage VGH1 to the output terminal OUT. In this case, the deactivated write scan signal GW1 may be output.

The seventh transistor M7 may include a first electrode connected to the output terminal OUT, a second electrode connected to the second input terminal IN2, and a control electrode connected to the second node ND2. The seventh transistor M7 may be switched depending on the voltage level of the second node ND2. The seventh transistor M7 may be defined as a second buffer part. In other words, the second buffer part may be connected to the second node ND2 and the output terminal OUT and may receive the second clock signal CK2 through the second input terminal IN2.

The seventh transistor M7 may determine the output of the second clock signal CK2 depending on the voltage of the second node ND2. For example, when the seventh transistor M7 is turned on, the seventh transistor M7 may provide the second clock signal CK2 to the output terminal OUT. In this case, the low level of the second clock signal CK2 may be output as the activated write scan signal GW1. Accordingly, the sixth and seventh transistors M6 and M7, which are the first and second buffer parts, may operate to output the write scan signal GW1 depending on voltage levels of the first and second nodes ND1 and ND2.

The first capacitor C1 may include a first electrode receiving the first high voltage VGH1 and a second electrode connected to the first node ND1. The second capacitor C2 may include a first electrode connected to the output terminal OUT and a second electrode connected to the second node ND2.

The ninth transistor M9 may include a first electrode connected to the first node ND1, a second electrode receiving the first low voltage VGL1, and a control electrode connected to the fourth input terminal IN4. The tenth transistor M10 may include a first electrode receiving the first high voltage VGH1, a second electrode connected to the second node ND2, and a control electrode connected to the fourth input terminal IN4.

The ninth and tenth transistors M9 and M10 may be switched in response to the first set signal SET1 received through the fourth input terminal IN4. When the ninth transistor M9 is turned on, the first low voltage VGL1 may be provided to the first node ND1 through the ninth transistor M9. When the tenth transistor M10 is turned on, the first high voltage VGH1 may be provided to the second node ND2 through the tenth transistor M10.

The first node ND1 may have the first low voltage VGL1, and thus the sixth transistor M6 may be turned on. Accordingly, when the first node ND1 has the first low voltage VGL1, the first output buffer part OBP1 may output the first high voltage VGH1.

The second node ND2 has the first high voltage VGH1, and thus the seventh transistor M7 may be turned off. Accordingly, when the second node ND2 has the first high voltage VGH1, the first output buffer part OBP1 may not output the second clock signal CK2. Accordingly, the first high voltage VGH1 may be output instead of outputting the second clock signal CK2 through the output terminal OUT and thus the deactivated write scan signal GW1 may be output.

When a still image is displayed, the write scan signal GW1 may not be applied to pixels from the second frame F2. Accordingly, the write scan signal GW1 needs to remain deactivated. However, when voltage levels of the first and second nodes ND1 and ND2 changes, the write scan signal GW1 may not remain deactivated.

In an embodiment of the present disclosure, when the still image is displayed, the first set part SEP1 may set the voltage levels of the first and second nodes ND1 and ND2 such that the first output buffer part OBP1 outputs the deactivated write scan signal GW1. For example, as described above, the first set part SEP1 may set the voltage of the first node ND1 to the first low voltage VGL1 and may set the voltage of the second node ND2 to the first high voltage VGH1.

Accordingly, when the still image is displayed, the write scan signal GW1 may be stably kept at a deactivated level by the first set part SEP1. In this case, power consumption may be reduced. The timing of the first set signal SET1 is shown below in FIG. 16.

A configuration of the first stage ST1 has been described, but the second stage ST2 may operate in substantially the same way as the first stage ST1. However, the second stage ST2 may operate in response to the write scan signal GW1 output from the first stage ST1. The seventh transistor M7, which is the second buffer part of the second stage ST2, may receive the first clock signal CK1. In other words, the second buffer part of each of the first and second stages ST1 and ST2 may receive either of the first and second clock signals CK1 and CK2.

Figure 14:
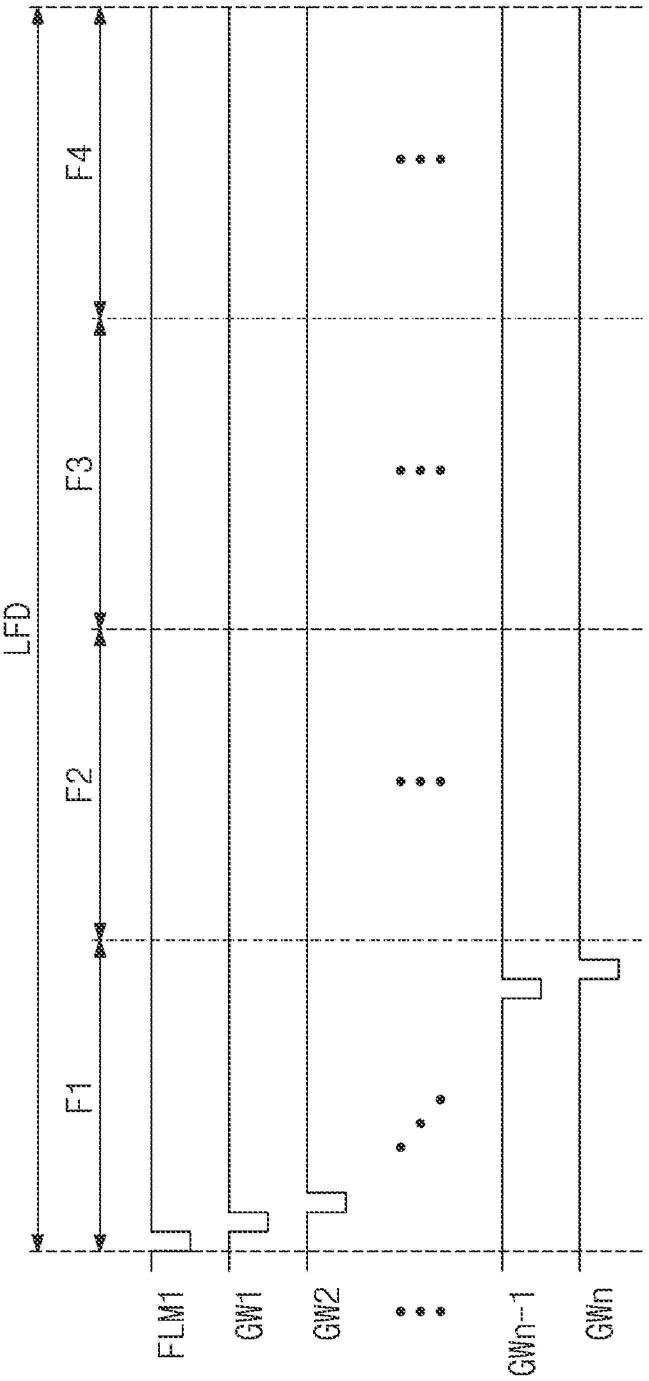
FIG. 14 is a diagram illustrating timings of write scan signals output from the stages shown in FIG. 11 in a low-frequency mode.

FIG. 13 is a diagram illustrating timings of write scan signals output from the stages shown in FIG. 11 in a normal mode. FIG. 14 is a diagram illustrating timings of write scan signals output from the stages shown in FIG. 11 in a low-frequency mode.

In FIGS. 13 and 14, first to fourth frames F1 to F4 are shown.

Referring to FIGS. 11, 12, and 13, the first stage ST1, which receives the first start signal FLM1, may operate first. Afterward, the second to n-th stages ST2 to STn may operate sequentially depending on a write scan signal output from the previous stage. Accordingly, the write scan signals GW1 to GWn may be sequentially output during each of the first to fourth frames F1 to F4. In the normal mode NFD, this operation may be repeated until the 120th frame F120.

Accordingly, in the normal mode NFD, the write scan signals GW1 to GWn having a first operating frequency (e.g., 120 Hz) may be output by the stages ST1 to STn, respectively. In other words, in the normal mode NFD, the first scan driving circuit SDC1 may output the write scan signals GW1 to GWn having the first operating frequency.

Referring to FIGS. 11, 12, and 14, in the low-frequency mode LFD, the write scan signals GW1 to GWn may be output sequentially during the first frame F1. However, from the second frame F2, the first start signal FLM1 may not be applied to the first scan driving circuit SDC1. Accordingly, the write scan signals GW1 to GWn may not be output from the second frame F2. In the low-frequency mode LFD, this operation may be repeated until the 120th frame F120.

An operation in which the write scan signals GW1 to GWn are not output may be defined as an operation in which the activated write scan signals GW1 to GWn are not output. In other words, an operation in which the write scan signals GW1 to GWn are not output may be defined as an operation in which the deactivated write scan signals GW1 to GWn are output. Because the write scan signals GW1 to GWn are not output during the second to 120th frames F2 to F120 in the low-frequency mode LFD, power consumption may be reduced.

Accordingly, in the low-frequency mode LFD, the write scan signals GW1 to GWn having a second operating frequency (e.g., 1 Hz) may be output by in the stages ST1 to STn, respectively. That is, in the low-frequency mode LFD, the first scan driving circuit SDC1 may output the write scan signals GW1 to GWn having the second operating frequency.

Figure 15:
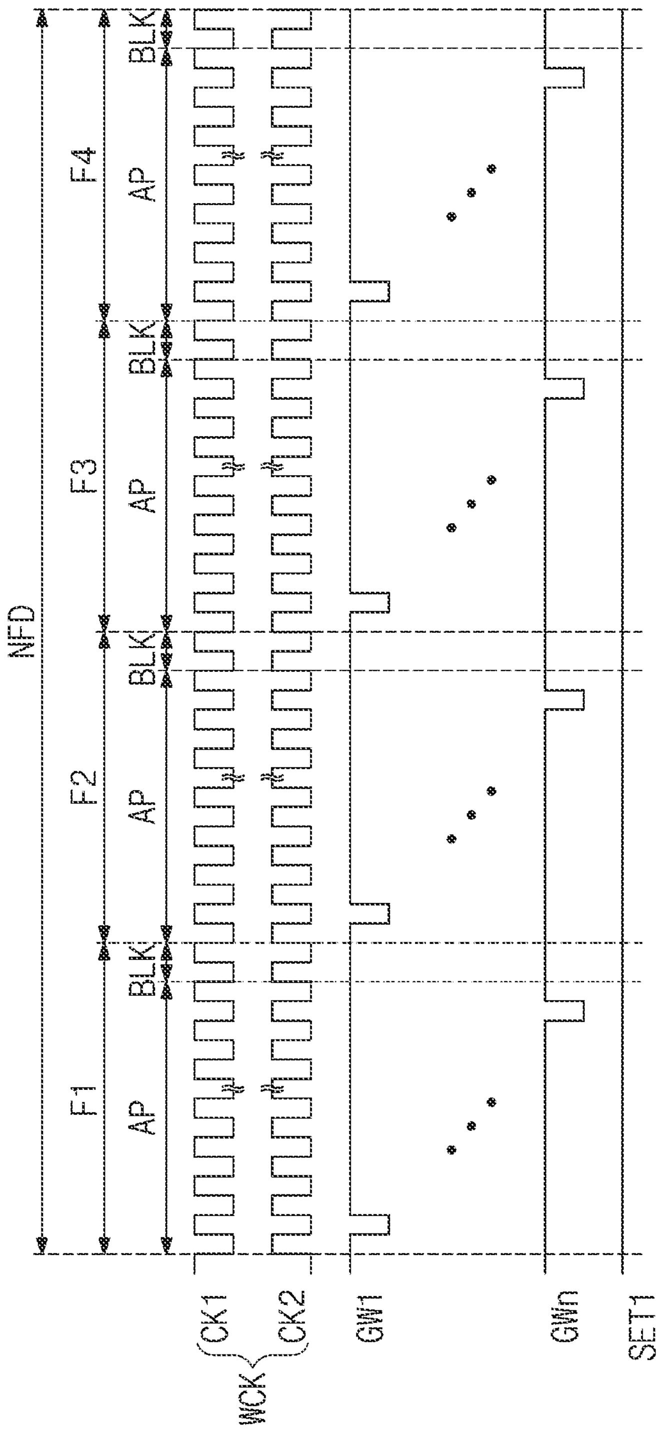
FIG. 15 is a diagram illustrating timings of first and second clock signals, write scan signals, and a first set signal in a normal mode.
Figure 16:
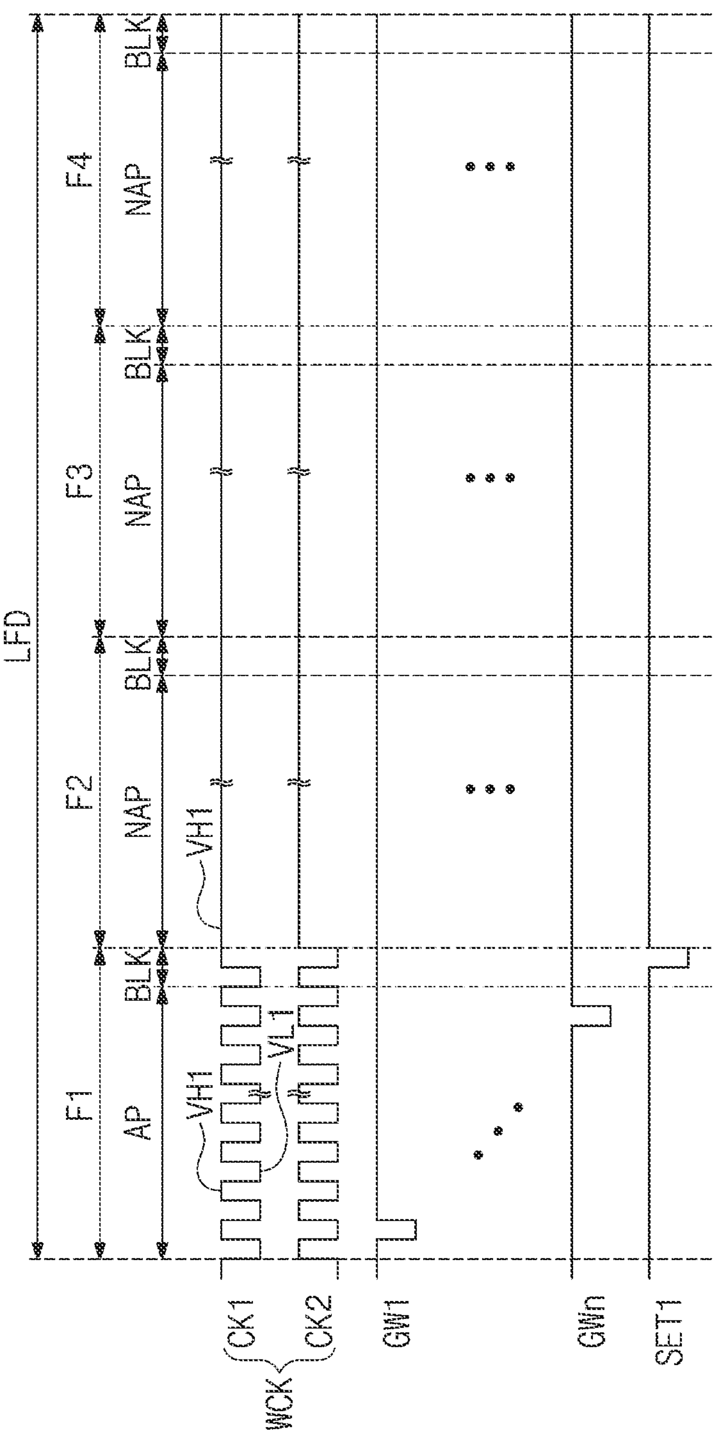
FIG. 16 is a diagram illustrating timings of first and second clock signals, write scan signals, and a first set signal in a low-frequency mode.

FIG. 15 is a diagram illustrating timings of first and second clock signals, write scan signals, and a first set signal in a normal mode. FIG. 16 is a diagram illustrating timings of first and second clock signals, write scan signals, and a first set signal in a low-frequency mode.

In FIGS. 15 and 16, the first to fourth frames F1 to F4 are shown to correspond to FIGS. 13 and 14.

Referring to FIGS. 11, 12, and 15, during each of the frames F1 to F4 of the normal mode NFD, the write scan signals GW1 to GWn may be output based on the first and second clock signals CK1 and CK2. This operation may be repeated until the 120th frame F120.

In the normal mode NFD, each of the frames F1 to F4 may include an active period AP and a blank period BLK following the active period AP. Although not shown in drawings, in the normal mode NFD, each of the fifth to 120th frames F5 to F120 may also include the active period AP and the blank period BLK.

In the active period AP of each of the frames F1 to F4, the write scan signals GW1 to GWn may be generated and output. That is, a period in which the write scan signals GW1 to GWn are output may be defined as the active period AP. During the active period AP, the write scan signals GW1 to GWn may be applied to the pixels PX.

The blank period BLK may be defined as an idle period. During the blank period BLK, the write scan signals GW1 to GWn may not be generated. The blank period BLK may be defined as a waiting period for an operation of the next frame.

In the normal mode NFD, the first set signal SET1 may be a DC signal having a high level. Accordingly, the ninth and tenth transistors M9 and M10 of the first set part SEP1 may be turned off in the normal mode NFD.

Referring to FIGS. 11, 12, and 16, in the low-frequency mode LFD, the write clock signal WCK may have an AC signal in the first frame F1 and may have a DC signal in the second to fourth frames F2 to F4. That is, the write clock signal WCK may be changed to a DC level from the second frame F2. When the first set signal SET1 is applied to the first scan driving circuit SDC1, the write clock signal WCK may have a DC level. The write clock signal WCK may maintain the DC level until the 120th frame F120.

The first and second clock signals CK1 and CK2 may have an AC signal in the first frame F1 and may have a DC signal in the second to 120th frames F2 to F120, but the embodiment of the present disclosure is not limited thereto. For example, during one of the third to 120th frames F3 to F120, each of the first and second clock signals CK1 and CK2 may be changed to have an AC signal again.

During the first frame F1, each of the first and second clock signals CK1 and CK2 may have an amplitude defined as a difference between a first high voltage VH1 and a first low voltage VL1 having a lower level than the first high voltage VH1. From the second frame F2, each of the first and second clock signals CK1 and CK2 may be changed to a DC signal having the first high voltage VH1. However, an embodiment is not limited thereto. For example, from the second frame F2, each of the first and second clock signals CK1 and CK2 may be changed to a DC signal having the first low voltage VL1.

Compared with a case in which the write clock signal WCK has an AC signal, power consumption may be reduced when the write clock signal WCK has a DC signal. Accordingly, in an embodiment of the present disclosure, power consumption of the display device DD may be reduced.

In the low-frequency mode LFD, the first frame F1 may include the active period AP and the blank period BLK. In the low-frequency mode LFD, the second frame F2 may include an inactive period NAP, in which the write scan signals GW1 to GWn are not output, and the blank period BLK following the inactive period NAP. In the low-frequency mode LFD, each of the subsequent frames F3 to F120 following the second frame F2 may also include the inactive period NAP and the blank period BLK.

In the inactive period NAP, the write scan signals GW1 to GWn may not be applied to the pixels PX. In other words, in the inactive period NAP, the write scan signals GW1 to GWn may maintain an inactive high level. In the inactive period NAP, the first scan driving circuit SDC1 may output the deactivated write scan signals GW1 to GWn.

During a period between the active period AP of the first frame F1 and the inactive period NAP of the second frame F2, the first set signal SET1 may be activated at a low level. That is, during the blank period BLK of the first frame F1, the first set signal SET1 may be activated at a low level and applied to the first scan driving circuit SDC1. An operation in which the first set signal SET1 is applied to the first scan driving circuit SDC1 may be defined as an operation in which the activated first set signal SET1 is applied to the first scan driving circuit SDC1.

The first scan driving circuit SDC1 may output the deactivated write scan signals GW1 to GWn in response to the first set signal SET1 received during the blank period BLK of the first frame F1. For example, in response to the first set signal SET1 received during the blank period BLK of the first frame F1, each of the first set parts SEP1 of the stages ST1 to STn may set the first node ND1 to the first low voltage VGL1 and may set the second node ND2 to the first high voltage VGH1.

Accordingly, the deactivated write scan signals GW1 to GWn are output, and thus the write scan signals GW1 to GWn may be more stably maintained at a deactivated level. As a result, power consumption may be reduced.

Figure 17:
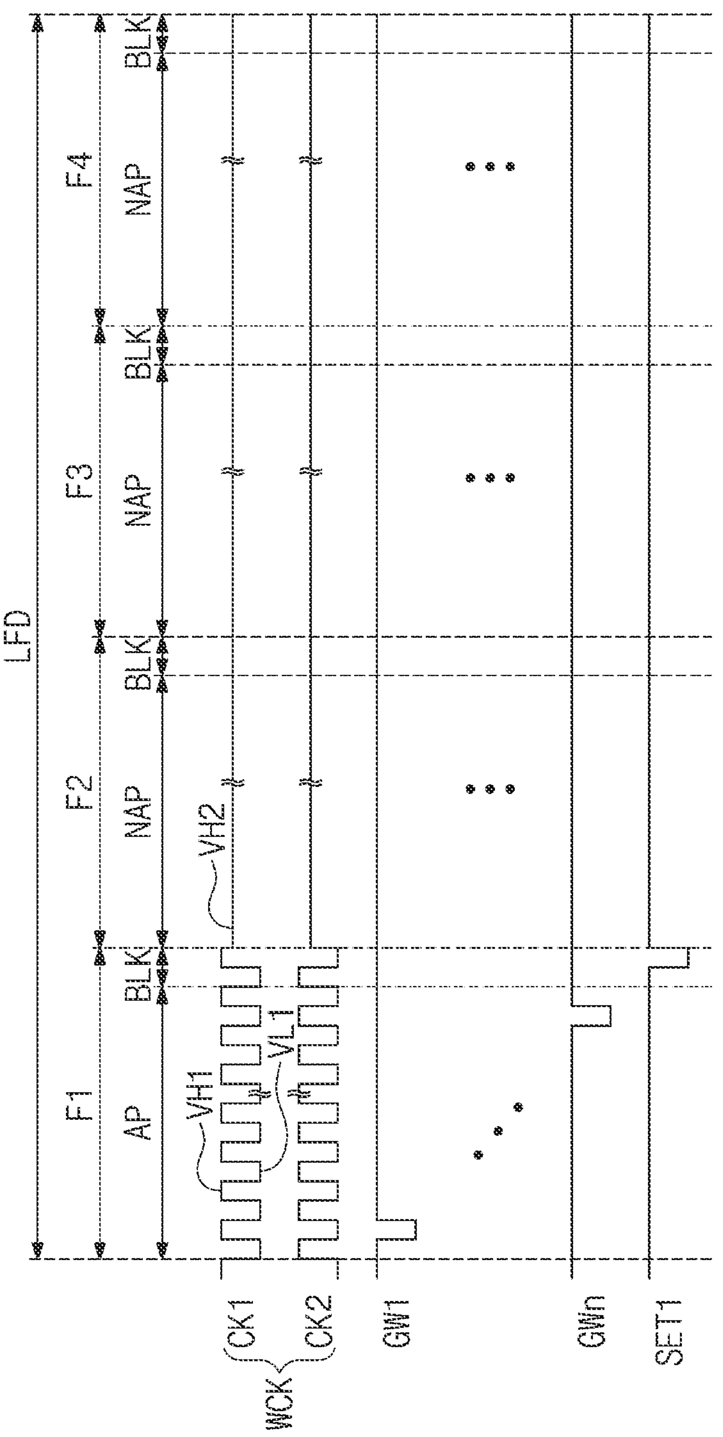
FIG. 17 is a diagram illustrating a timing of a write clock signal in a low-frequency mode.

FIG. 17 is a diagram illustrating a timing of a write clock signal in a low-frequency mode.

FIG. 17 shows a timing corresponding to FIG. 16.

Referring to FIGS. 16 and 17, a level of the DC signal of the write clock signal WCK may be set in various ways. For example, unlike FIG. 16, from the second frame F2, each of the first and second clock signals CK1 and CK2 may have a second high voltage VH2 having a voltage level that is lower than the first high voltage VH1 and higher than the first low voltage VL1.

Figure 18:
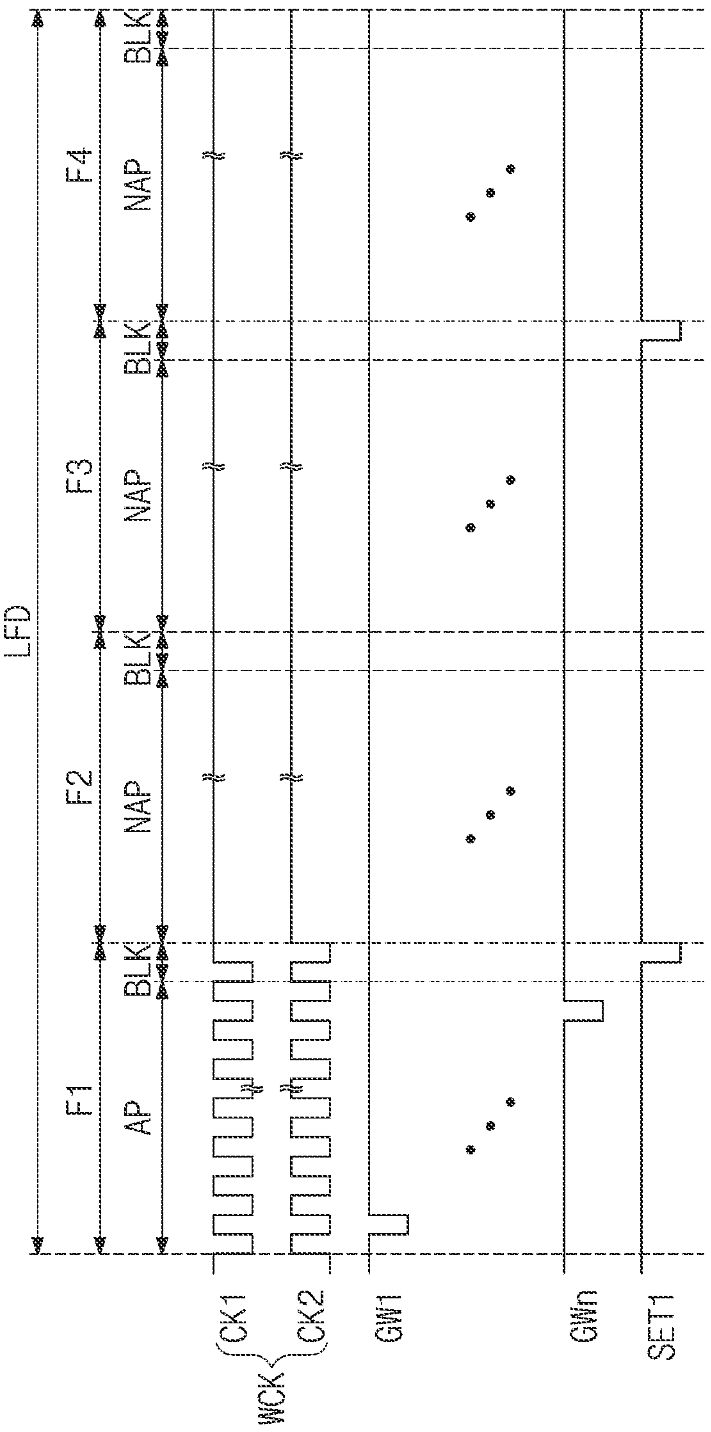
FIG. 18 is a diagram illustrating a timing of a first set signal in a low-frequency mode.

FIG. 18 is a diagram illustrating a timing of a first set signal in a low-frequency mode.

FIG. 18 shows a timing corresponding to FIG. 16.

Referring to FIGS. 11, 12, 16, and 18, the first set signal SET1 may be provided to the first set part SEP1 a plurality of times. For example, the first set signal SET1 may be applied to the first scan driving circuit SDC1 during the blank period BLK of the first frame F1 and, additionally, may be further applied to the first scan driving circuit SDC1 during at least one blank period BLK among the subsequent blank periods BLK.

As shown in FIG. 18, during the blank period BLK of the third frame F3, the first set signal SET1 may be applied to the first scan driving circuit SDC1, but is not limited thereto. For example, the first set signal SET1 may be applied to the first scan driving circuit SDC1 during the various blank periods BLK.

The first set signal SET1 may be applied to the first scan driving circuit SDC1 inversely proportional to the second operating frequency. For example, when the second operating frequency is changed to 60 Hz, 30 Hz, 10 Hz, or 1 Hz, the first set signal SET1 may be applied to the first scan driving circuit SDC1 once, 20 times, 30 times, or 60 times.

Figure 19:
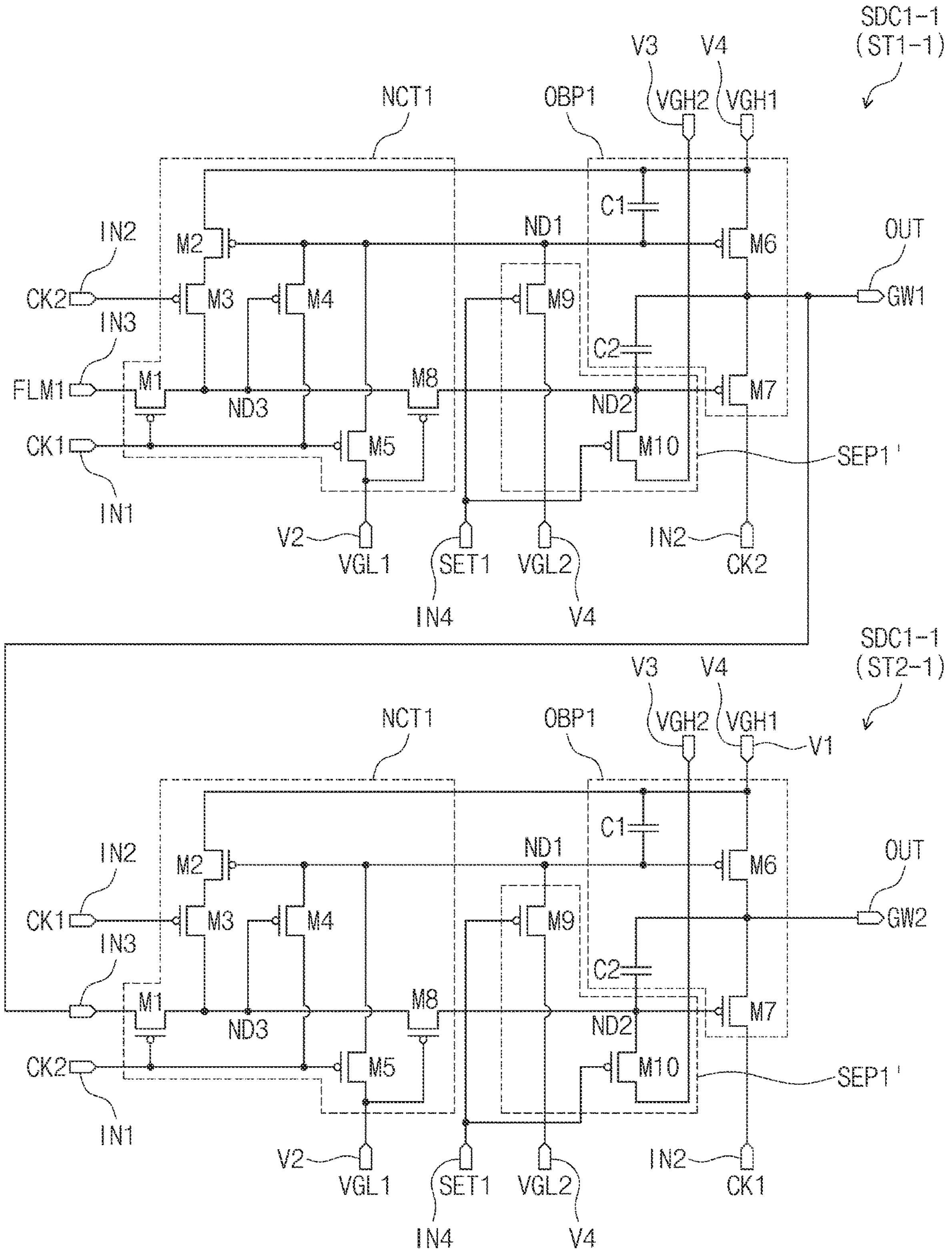
FIG. 19 is a diagram showing a circuit configuration of first and second stages of a first scan driving circuit, according to an embodiment of the present disclosure.

FIG. 19 is a diagram showing a circuit configuration of first and second stages of a first scan driving circuit according to an embodiment of the present disclosure.

First and second stages ST1-1 and ST2-1 shown in FIG. 19 may correspond to the first and second stages ST1 and ST2 shown in FIG. 12. Hereinafter, a configuration of the first stage ST1-1 will be described focusing on a configuration different from that of the first stage ST1 shown in FIG. 12. Although not shown in drawings, a first scan driving circuit SDC1-1 may include third to n-th stages, each of which has the same configuration as the first stage ST1-1 or the second stage ST2-1.

Referring to FIG. 19, a first set part SEP1' of the first stage ST1-1 may receive a second high voltage VGH2 and a second low voltage VGL2 unlike an embodiment in FIG. 12. The first stage ST1-1 may include a third voltage terminal V3 receiving the second high voltage VGH2 and a fourth voltage terminal V4 receiving the second low voltage VGL2.

In response to the first set signal SET1, the first set part SEP1' may set the voltage of the first node ND1 to the second low voltage VGL2, and may set the voltage of the second node ND2 to the second high voltage VGH2. The second high voltage VGH2 may have a different level from the first high voltage VGH1, and the second low voltage VGL2 may have a different level from the first low voltage VGL1. The second low voltage VGL2 may have a lower level than the second high voltage VGH2.

The ninth transistor M9 may include a first electrode connected to the first node ND1, a second electrode receiving the second low voltage VGL2, and a control electrode connected to the fourth input terminal IN4. The tenth transistor M10 may include a first electrode receiving the second high voltage VGH2, a second electrode connected to the second node ND2, and a control electrode connected to the fourth input terminal IN4.

When the ninth transistor M9 is turned on, the second low voltage VGL2 may be provided to the first node ND1 through the ninth transistor M9. When the tenth transistor M10 is turned on, the second high voltage VGH2 may be provided to the second node ND2 through the tenth transistor M10.

Because the first node ND1 has the second low voltage VGL2, the sixth transistor M6 may be turned on. Because the second node ND2 has the second high voltage VGH2, the seventh transistor M7 may be turned off. Accordingly, the first high voltage VGH1 may be output through the output terminal OUT and thus the deactivated write scan signal GW1 may be output.

Figure 20:
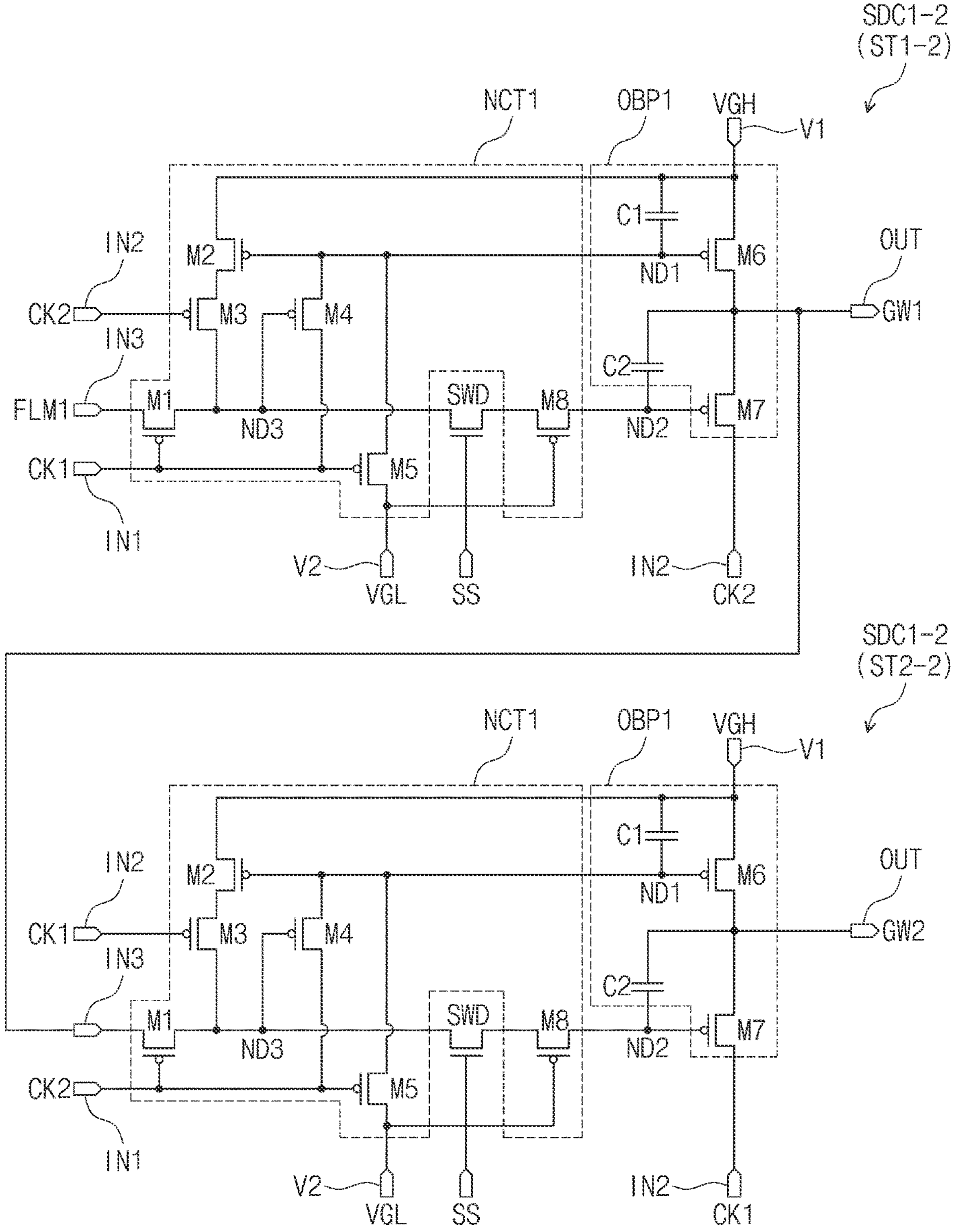
FIG. 20 is a diagram showing a circuit configuration of first and second stages of a first scan driving circuit, according to an embodiment of the present disclosure.

FIG. 20 is a diagram showing a circuit configuration of first and second stages of a first scan driving circuit according to an embodiment of the present disclosure.

First and second stages ST1-2 and ST2-2 shown in FIG. 20 may correspond to the first and second stages ST1 and ST2 shown in FIG. 12. Hereinafter, a configuration of the first stage ST1-2 will be described focusing on a configuration different from that of the first stage ST1 shown in FIG. 12. Although not shown in drawings, a first scan driving circuit SDC1-2 may include third to n-th stages, each of which has the same configuration as the first stage ST1-2 or the second stage ST2-2.

Referring to FIG. 20, unlike the first stage ST1 shown in FIG. 12, the first stage ST1-2 does not include the first set part SEP1 and may include a switching element SWD. The switching element SWD may be an NMOS transistor.

The switching element SWD may be connected to the second node ND2 and the third input terminal IN3 receiving the first start signal FLM1, and may be switched in response to a control signal SS. The control signal SS may be defined as a set signal. The switching element SWD may be connected to the third input terminal IN3 through the third node ND3. The switching element SWD may be connected to the third input terminal IN3 through the first transistor M1. The switching element SWD may be connected to the second node ND2 through the eighth transistor M8. When the eighth transistor M8 is omitted, the switching element SWD may be directly connected to the second node ND2.

The switching element SWD may include a first electrode connected to the third node ND3, a second electrode connected to the second node ND2 through the eighth transistor M8, and a control electrode receiving the control signal SS. The switching element SWD may switch a connection between the second node ND2 and the third node ND3 in response to the control signal SS.

Figure 21:
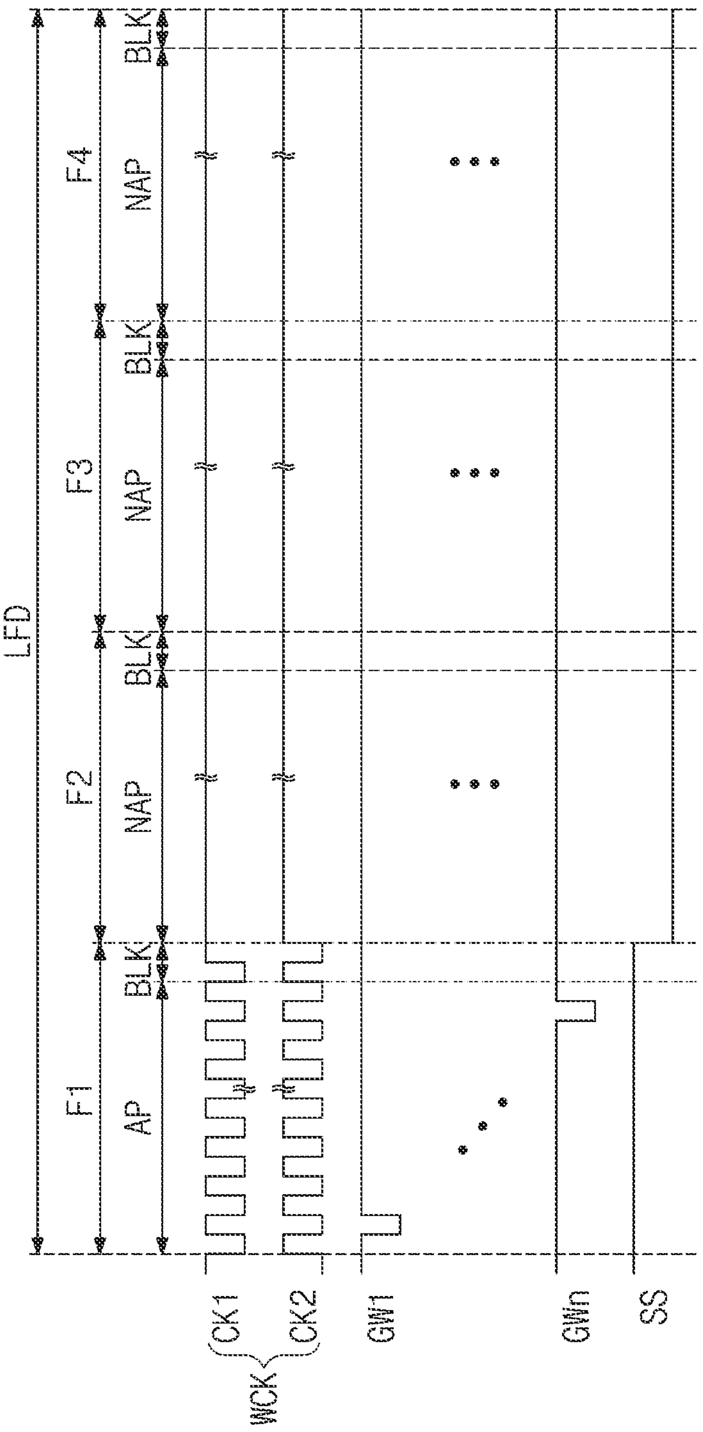
FIG. 21 is a diagram illustrating a timing of a control signal applied to the switching element shown in FIG. 20 in a low-frequency mode.

FIG. 21 is a diagram illustrating a timing of a control signal applied to the switching element shown in FIG. 20 in a low-frequency mode.

FIG. 21 is a timing diagram corresponding to FIG. 16.

Referring to FIGS. 20 and 21, during the first frame F1 of the low-frequency mode LFD, the control signal SS may have a high level, and the switching element SWD may be turned on. The third node ND3 may be connected to the second node ND2 through the switching element SWD and the eighth transistor M8 which is turned. Accordingly, the write scan signals GW1 to GWn may be generated and output. Although not shown in drawings, even in the normal mode NFD, the control signal SS may maintain a high level like the first frame F1.

From the second frame F2 of the low-frequency mode LFD, the control signal SS may have a low level, and the switching element SWD may be turned off. That is, during a period in which the write scan signals GW1 to GWn are not applied to the pixel PX, the switching element SWD may be turned off. Accordingly, a connection between the second node ND2 and the third node ND3 may be disconnected. Also, a connection between the second node ND2 and the third input terminal IN3 may be disconnected. In detail, a connection between the eighth transistor M8 and the third node ND3 may be disconnected.

In the low-frequency mode LFD, during a period in which the write scan signals GW1 to GWn are not applied to the pixel PX, leakage current may occur through various paths. For example, with respect to the voltage of the second node ND2, a leakage current may occur through the third node ND3, the second and third transistors M2 and M3, and the first voltage terminal V1. Also, with respect to the voltage of the second node ND2, a leakage current may occur through the third node ND3 and the third input terminal IN3.

When the write scan signals GW1 to GWn are deactivated after being activated during the first frame F1, the first node ND1 may be substantially maintained at a low voltage, and the second node ND2 may be maintained at a high voltage. Accordingly, the sixth transistor M6 may be turned on, and the seventh transistor M7 may be turned off. Accordingly, the first high voltage VGH1 may be output as the deactivated write scan signals GW1 to GWn. However, when the voltage level of the second node ND2 changes due to the leakage current, the write scan signals GW1 to GWn may fail to be maintained at an inactive state.

In an embodiment of the present disclosure, the leakage current path may be blocked by turning off the switching element SWD from the second frame F2 of the low-frequency mode LFD. Accordingly, the voltage level of the second node ND2 may be stably maintained, and thus the write scan signals GW1 to GWn may be maintained in an inactive state.

Figure 22:
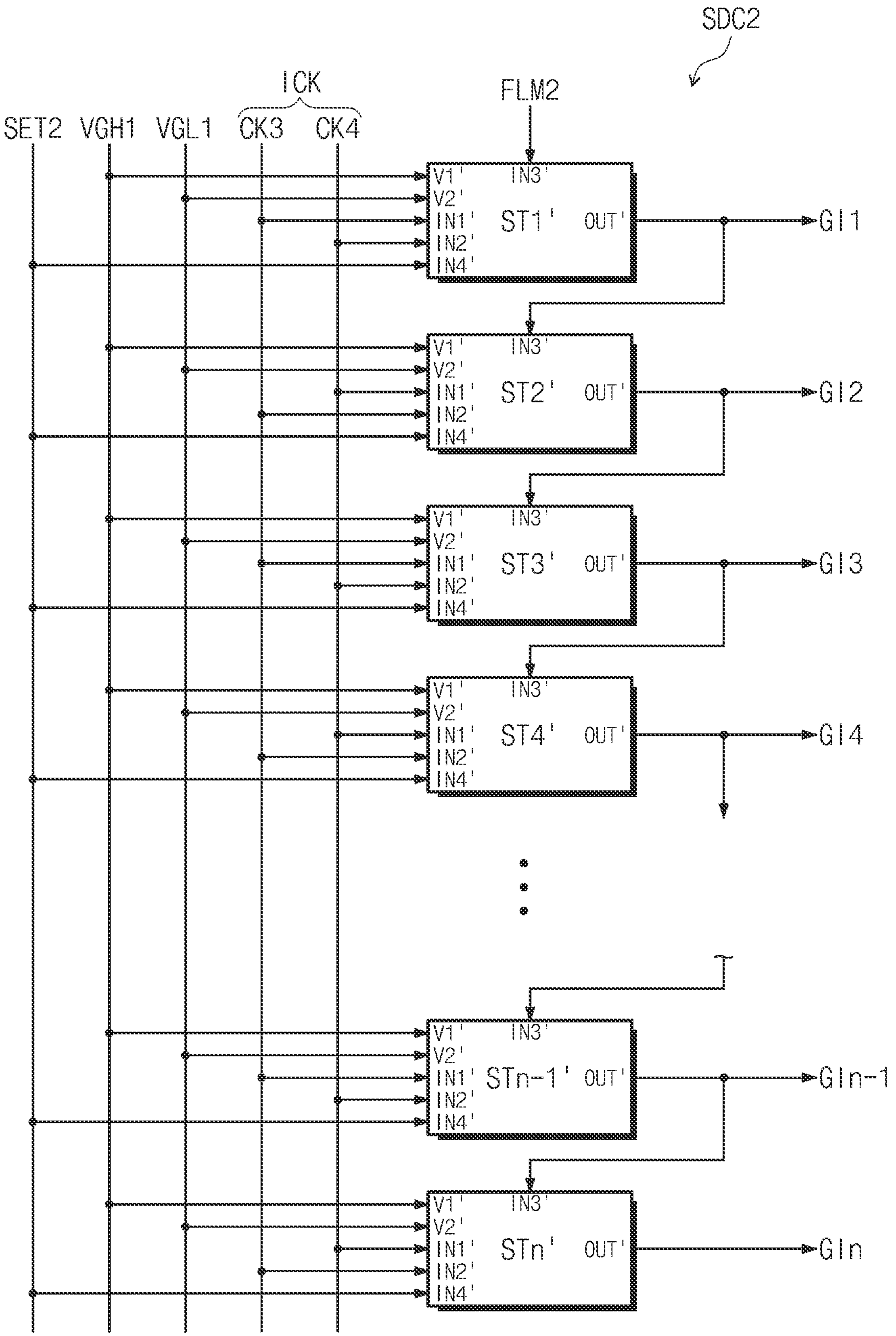
FIG. 22 is a block diagram of a second scan driving circuit of the scan driving circuit shown in FIG. 5.

FIG. 22 is a block diagram of a second scan driving circuit of the scan driving circuit shown in FIG. 5.

Referring to FIGS. 5 and 11, the scan driving circuit SDC may include a second scan driving circuit SDC2 for generating the initialization scan signals GI1 to GIn. The second scan driving circuit SDC2 may include a plurality of stages ST1' to STn' that are continuously connected in a sequential manner. The stages ST1' to STn' may output the initialization scan signals GI1 to GIn. The initialization scan signals GI1 to GIn may be output through the initialization scan lines GIL1 to GILn shown in FIG. 5.

Although not shown in drawings, the scan driving circuit SDC may include a third scan driving circuit for generating the compensation scan signals GC1 to GCn. The third scan driving circuit may have substantially the same configuration as the second scan driving circuit SDC2 except for the output timing of the compensation scan signals GC1 to GCn. Moreover, although not shown in drawings, the emission driving circuit EDC may have substantially the same configuration as the second scan driving circuit SDC2.

The stages ST1' to STn' may receive a second start signal FLM2 or an initialization scan signal from the previous stage, an initialization clock signal ICK, a second set signal SET2, the first high voltage VGH1, and the first low voltage VGL1. The above-described scan control signal SCS may include the second start signal FLM2, the initialization clock signal ICK, and the second set signal SET2.

Each of the stages ST1' to STn' may include first to fourth input terminals IN1' to IN4', first and second voltage terminals V1' and V2', and an output terminal OUT'. The stages ST1' to STn' may receive the second start signal FLM2 or the initialization scan signal output from the previous stage, the initialization clock signal ICK, the second set signal SET2, the first high voltage VGH1, and the first low voltage VGL1 through the first to fourth input terminals IN1' to IN4' and the first and second voltage terminals V1' and V2'. The stages ST1' to STn' may output the initialization scan signals GI1 to GIn through the output terminals OUT', respectively.

The stages ST1' to STn' may receive the initialization clock signal ICK or the initialization scan signal output from the previous stage through the first and second input terminals IN1' and IN2'. The initialization clock signal ICK may include the third clock signal CK3 and the fourth clock signal CK4 having an opposite phase to that of the third clock signal CK3. In an embodiment of the present disclosure, the third and fourth clock signals CK3 and CK4 may be referred to differently. For example, in the second scan driving circuit SDC2, the third clock signal CK3 may be referred to as a first clock signal CK3, and the fourth clock signal CK4 may be referred to as the second clock signal CK4.

The third clock signal CK3 and the fourth clock signal CK4 may be alternately applied to the first and second input terminals IN1' and IN2'. For example, the third clock signal CK3 may be applied to the first input terminals IN1' of the odd-numbered stages ST1', ST3', and STn−1'. The fourth clock signal CK4 may be applied to the second input terminals IN2' of the odd-numbered stages ST1', ST3', and STn−1'.

The fourth clock signal CK4 may be applied to the first input terminals IN1' of the even-numbered stages ST2', ST4', and STn'. The third clock signal CK3 may be applied to the second input terminals IN2' of the even-numbered stages ST2', ST4', and STn'.

The first stage ST1 among the stages ST1' to STn' may receive the second start signal FLM2 through the third input terminal IN3'. In the second to n-th stages ST2' to STn', the current stage may receive an initialization scan signal output from the previous stage through the third input terminal IN3'. The stages ST1' to STn' may receive the first high voltage VGH1 through the first voltage terminals V1', and may receive the first low voltage VGL1 through the second voltage terminals V2'.

The first stage ST1' may be activated in response to the second start signal FLM2. In the second to n-th stages ST2' to STn', the current stage may be activated in response to the initialization scan signal output from the previous stage.

The activated stages ST1' to STn' may apply the initialization scan signals GI1 to GIn to the pixels PX in response to the write clock signal ICK. The activated stages ST1' to STn' may output the initialization scan signals GI1 to GIn by using the third and fourth clock signals CK3 and CK4, the first high voltage VGH1, and the first low voltage VGL1.

In the normal mode NFD, each of the stages ST1' to STn' may output an initialization scan signal having a first operating frequency. In the low-frequency mode LFD, each of the stages ST1' to STn' may output an initialization scan signal having a second operating frequency. In the low-frequency mode LFD, the stages ST1' to STn' may output the deactivated initialization scan signals GI1 to GIn in response to the second set signal SET2. Hereinafter, this operation will be described in detail.

Figure 23:
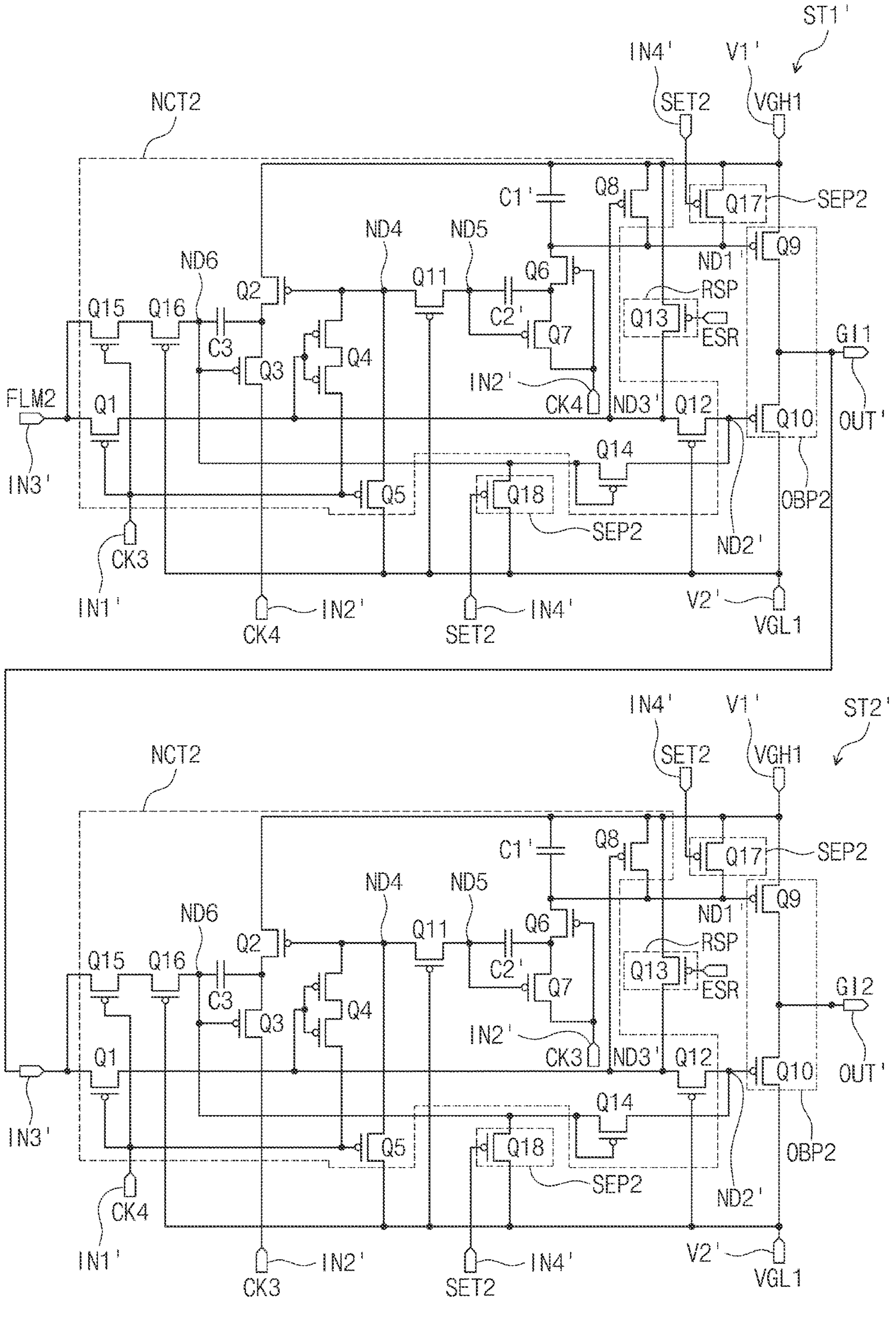
FIG. 23 is a diagram showing a circuit configuration of the first and second stages shown in FIG. 22.

FIG. 23 is a diagram showing a circuit configuration of the first and second stages shown in FIG. 22.

Although not shown in drawings, each of other stages ST3' to STn' may have the same configuration as the first stage ST1' or the second stage ST2' shown in FIG. 12. The first stage ST1' and the second stage ST2' have substantially the same configuration, and thus, a configuration of the first stage ST1' will be described below.

Referring to FIG. 23, the first stage ST1' may include a second node controller NCT2, a second output buffer part OBP2, a second set part SEP2, and a reset part RSP.

The second node controller NCT2 may be connected to a first node ND1' and a second node ND2'. The second node controller NCT2 may receive the first high voltage VGH1, the first low voltage VGL1, the second start signal FLM2, the third clock signal CK3, and the fourth clock signal CK4. The second node controller NCT2 may control the voltage level of the first node ND1' and the voltage level of the second node ND2' in response to the first high voltage VGH1, the first low voltage VGL1, the second start signal FLM2, the third clock signal CK3, and the fourth clock signal CK4.

The second output buffer part OBP2 may be connected to the first node ND1' and the second node ND2'. The second output buffer part OBP2 may receive the first high voltage VGH1 and the first low voltage VGL1. The second output buffer part OBP2 may output the initialization scan signal GI1 depending on the voltage levels of the first and second nodes ND1' and ND2'. The initialization scan signal GI1 may be provided to the third input terminal IN3' of the second stage ST2.

The second output buffer part OBP2 may determine the output of the first high voltage VGH1 depending on the voltage of the first node ND1'. The second output buffer part OBP2 may determine the output of the first low voltage VGL1 depending on the voltage of the second node ND2'.

The second set part SEP2 may be connected to the first node ND1' and the second node ND2'. The second set part SEP2 may receive the second set signal SET2. In response to the second set signal SET2, the second set part SEP2 may set the voltage of the first node ND1' to the first high voltage VGH1, and may set the voltage of the second node ND2' to the first low voltage VGL1. In this case, the second output buffer part OBP2 may stably output the deactivated initialization scan signal GI1.

For the above-mentioned operation, the second node controller NCT2 may include first to eighth transistors Q1 to Q8, eleventh and twelfth transistors Q11 and Q12, fourteenth to sixteenth transistors Q14 to Q16, and first to third capacitors C1' to C3'. For the above-mentioned operation, the second output buffer part OBP2 may include ninth and tenth transistors Q9 and Q10. For the above-mentioned operation, the second set part SEP2 may include seventeenth and eighteenth transistors Q17 and Q18. The reset part RSP may include a thirteenth transistor Q13.

The first to eighteenth transistors Q1 to Q18 may be PMOS transistors, but are not limited thereto. For example, the first to eighteenth transistors Q1 to Q18 may be NMOS transistors. The first to eighteenth transistors Q1 to Q18 may be defined as switching elements.

The first transistor Q1 may include a first electrode connected to a third input terminal IN3', a second electrode connected to a third node ND3', and a control electrode connected to the first input terminal IN1'. The third node ND3' may be connected to the second node ND2' through the twelfth transistor Q12.

Although not shown in drawings, the switching element SWD illustrated in FIG. 20 may also be applied to the second scan driving circuit SDC2 illustrated in FIG. 23. For example, the switching element SWD shown in FIG. 20 may be connected between the second node ND2' and the third input terminal IN3' in FIG. 23 and may be switched in response to the control signal SS. In FIG. 23, the switching element SWD shown in FIG. 20 may be connected to the second node ND2' through the twelfth transistor Q12 and may be connected to the third input terminal IN3' through the first transistor Q1.

The first transistor Q1 may be switched in response to the third clock signal CK3 received through the first input terminal IN1'. When the third clock signal CK3 is at a low level, the first transistor Q1 may be turned on to apply the second start signal FLM2 received through the third input terminal IN3' to the third node ND3'. The second start signal FLM2 may be a single pulse signal (shown in FIG. 24) transitioning to a high level once per one frame.

The second transistor Q2 may include a first electrode receiving the first high voltage VGH1, a second electrode connected to the third transistor Q3, and a control electrode connected to a fourth node ND4. The second transistor Q2 may be switched depending on the voltage of the fourth node ND4.

The third transistor Q3 may include a first electrode connected to the second electrode of the second transistor Q2, a second electrode connected to the second input terminal IN2', and a control electrode connected to a sixth node ND6. The third transistor Q3 may be switched depending on the voltage of the sixth node ND6. The third transistor Q3 may receive the fourth clock signal CK4 through the second input terminal IN2'.

The third capacitor C3 may be connected between the sixth node ND6 and the first electrode of the third transistor Q3. When the third transistor Q3 is turned on, the fourth clock signal CK4 may be supplied through the third transistor Q3. According to a change in the voltage level of the fourth clock signal CK4, the voltage level of the sixth node N6 may swing within a predetermined range due to coupling of the third capacitor C3.

The fourth transistor Q4 may have a dual gate structure. The fourth transistor Q4 may include a first electrode connected to the fourth node ND4, a second electrode connected to the first input terminal IN1', and a control electrode connected to the third node ND3'. The fourth transistor Q4 may be switched depending on the voltage of the third node ND3'. When the fourth transistor Q4 is turned on, the fourth transistor Q4 may apply the third clock signal CK3 received through the first input terminal IN1' to the fourth node ND4.

The fifth transistor Q5 may include a first electrode connected to the fourth node ND4, a second electrode receiving the first low voltage VGL1, and a control electrode connected to the first input terminal IN1'. The fifth transistor Q5 may be switched in response to the third clock signal CK3 received through the first input terminal IN1'. When the fifth transistor Q5 is turned on, the fifth transistor Q5 may apply the first low voltage VGL1 to the fourth node ND4.

The sixth transistor Q6 may include a first electrode connected to the first node N1', a second electrode connected to the seventh transistor Q7, and a control electrode connected to the second input terminal IN2'. The sixth transistor Q6 may be switched in response to the fourth clock signal CK4 received through the second input terminal IN2'.

The seventh transistor Q7 may include a first electrode connected to the second electrode of the sixth transistor Q6, a second electrode connected to the second input terminal IN2', and a control electrode connected to a fifth node ND5. The seventh transistor Q7 may be switched depending on the voltage of the fifth node ND5. The second capacitor C2' may be connected between the fifth node ND5 and the second electrode of the sixth transistor Q6.

The eighth transistor Q8 may include a first electrode receiving the first high voltage VGH1, a second electrode connected to the first node ND1', and a control electrode connected to the third node ND3'. The eighth transistor Q8 may be switched depending on the voltage of the third node ND3'.

The first capacitor C1' may be connected between the first node ND1' and the first voltage terminal V1'. The first capacitor C1' may charge the voltage applied to the first node ND1' and may stably maintain the voltage of the first node ND1'.

The eleventh transistor Q11 may include a first electrode connected to the fourth node ND4, a second electrode connected to the fifth node ND5, and a control electrode receiving the first low voltage VGL1. The eleventh transistor Q11 may be turned on by the first low voltage VGL1 and may remain turned on.

The twelfth transistor Q12 may include a first electrode connected to the third node ND3', a second electrode connected to the second node ND2', and a control electrode receiving the first low voltage VGL1. The twelfth transistor Q12 may be turned on by the first low voltage VGL1 and may remain turned on. The twelfth transistor Q12 may perform a function similar to that of the above-described eighth transistor M8.

The fourteenth transistor Q14 may include a first electrode and a control electrode connected to the sixth node ND6 and a second electrode connected to the second node ND2'. According to this connection structure, the fourteenth transistor Q14 may be diode-connected.

The fourteenth transistor Q14 may operate as a rectifier between the second node ND2' and the sixth node ND6. For example, the voltage of the sixth node ND6 having a form similar to AC voltage may be converted into a form of DC voltage at the second node ND2' by the fourteenth transistor Q14. Accordingly, despite a voltage change of the sixth node ND6, the voltage of the second node ND2' may be maintained at a constant level by the charge pump operation of the fourteenth transistor Q14.

The fifteenth transistor Q15 may include a first electrode connected to the third input terminal IN3', a second electrode connected to the sixteenth transistor Q16, and a control electrode connected to the first input terminal IN1'. The fifteenth transistor Q15 may be switched in response to the third clock signal CK3 received through the first input terminal IN1'. The fifteenth transistor Q15 may be turned on in response to the third clock signal CK3, and may provide the signal received from the third input terminal IN3' to the sixth node ND6.

The sixteenth transistor Q16 may include a first electrode connected to the second electrode of the fifteenth transistor Q15, a second electrode connected to the sixth node ND6, and a control electrode receiving the first low voltage VGL1. The sixteenth transistor Q16 may be turned on by the first low voltage VGL1 and may remain turned on. The sixteenth transistor Q16 may alleviate the bias stress applied to the fifteenth transistor Q15.

The ninth transistor Q9 may include a first electrode receiving the first high voltage VGH1, a second electrode connected to the output terminal OUT', and a control electrode connected to the first node ND1'. The ninth transistor Q9 may be switched depending on the voltage level of the first node ND1'. The ninth transistor Q9 may determine the output of the first high voltage VGH1 depending on the voltage of the first node ND1'. The activated initialization scan signal GI1 may be output depending on a change in the voltage level of the first node ND1'. The tenth transistor Q10 may include a first electrode connected to the output terminal OUT', a second electrode receiving the first low voltage VGL1, and a control electrode connected to the second node ND2'. The tenth transistor Q10 may be switched depending on the voltage level of the second node ND2'. The tenth transistor Q10 may determine the output of the first low voltage VGL1 depending on the voltage of the second node ND2'.

The ninth transistor Q9 may be defined as a first buffer part. That is, the first buffer part may be connected between the first voltage terminal V1' and the output terminal OUT', and may receive the first high voltage VGH1. The tenth transistor Q10 may be defined as a second buffer part. That is, the second buffer part may be connected between the second voltage terminal V2' and the output terminal OUT', and may receive the first low voltage VGL1. The ninth and tenth transistors Q9 and Q10, which are the first and second buffer parts, may operate to output the initialization scan signal GI1 depending on voltage levels of the first and second nodes ND1' and ND2'.

The seventh transistor Q7, which is the above-mentioned second buffer part, may receive one of the third and fourth clock signals CK3 and CK4. The tenth transistor Q10, which is the above-mentioned second buffer part, may receive the first low voltage VGL1. Accordingly, the second buffer part of each stage of the first and second scan driving circuits SDC1 and SDC2 may receive either one clock signal of the third and fourth clock signals CK3 and CK4 or the first low voltage VGL1.

The thirteenth transistor Q13 may include a first electrode receiving a first high voltage VGH1, a second electrode connected to the third node ND3', and a control electrode receiving a reset signal ESR. Although not shown in drawings, each of the stages ST1' to STn' shown in FIG. 22 may further include an input terminal for receiving a reset signal.

The reset signal ESR may be a signal activated at a low level when the display device DD is powered on or reset. When the reset signal ESR is at a low level, the thirteenth transistor Q13 may be turned on to apply the first high voltage VGH1 to the third node ND3' and the second node ND2'. Accordingly, the initialization scan signal GI1 output to the output terminal OUT' when the transistors Q4, Q8, and Q10 are turned off may be prevented from being output at an undesired level.

The seventeenth transistor Q17 may include a first electrode receiving the first high voltage VGH1, a second electrode connected to the first node ND1', and a control electrode connected to the fourth input terminal IN4'. The eighteenth transistor Q18 may include a first electrode connected to the second node ND2' through the fourteenth transistor Q14, a second electrode receiving the first low voltage VGL1, and a control electrode connected to the fourth input terminal IN4'.

The seventeenth and eighteenth transistors Q17 and Q18 may be switched in response to the second set signal SET2 received through the fourth input terminal IN4'. When the seventeenth transistor Q17 is turned on, the first high voltage VGH1 may be provided to the first node ND1' through the seventeenth transistor Q17. When the eighteenth transistor Q18 is turned on, the first low voltage VGL1 may be provided to the second node ND2' through the eighteenth transistor Q18.

Because the first node ND1' has the first high voltage VGH1, the ninth transistor Q9 may be turned off. Accordingly, when the first node ND1 has the first high voltage VGH1, the first output buffer part OBP1 may not output the first high voltage VGH1.

Because the second node ND2' has the first low voltage VGL1, the tenth transistor Q10 may be turned on. Accordingly, when the second node ND2' has the first low voltage VGL1, the first low voltage VGL1 may be output through the output terminal OUT', and thus the deactivated initialization scan signal GI1 may be output.

When a still image is displayed, the initialization scan signal GI1 may not be applied to the pixels PX from the second frame F2 in the same manner as the above-described write scan signal GW1. Accordingly, the initialization scan signal GI1 needs to remain deactivated. However, when voltage levels of the first and second nodes ND1 and ND2 changes, the initialization scan signal GI1 may not remain deactivated.

In an embodiment of the present disclosure, when the still image is displayed, the second set part SEP2 may set the voltage levels of the first and second nodes ND1' and ND2' such that the second output buffer part OBP2 outputs the deactivated initialization scan signal GI1. The second set part SEP2 may set the voltage of the first node ND1' to the first high voltage VGH1, and may set the voltage of the second node ND2' to the first low voltage VGL1. Accordingly, when the still image is displayed, the initialization scan signal GI1 may be stably kept at a deactivated level by the second set part SEP2.

Figure 24:
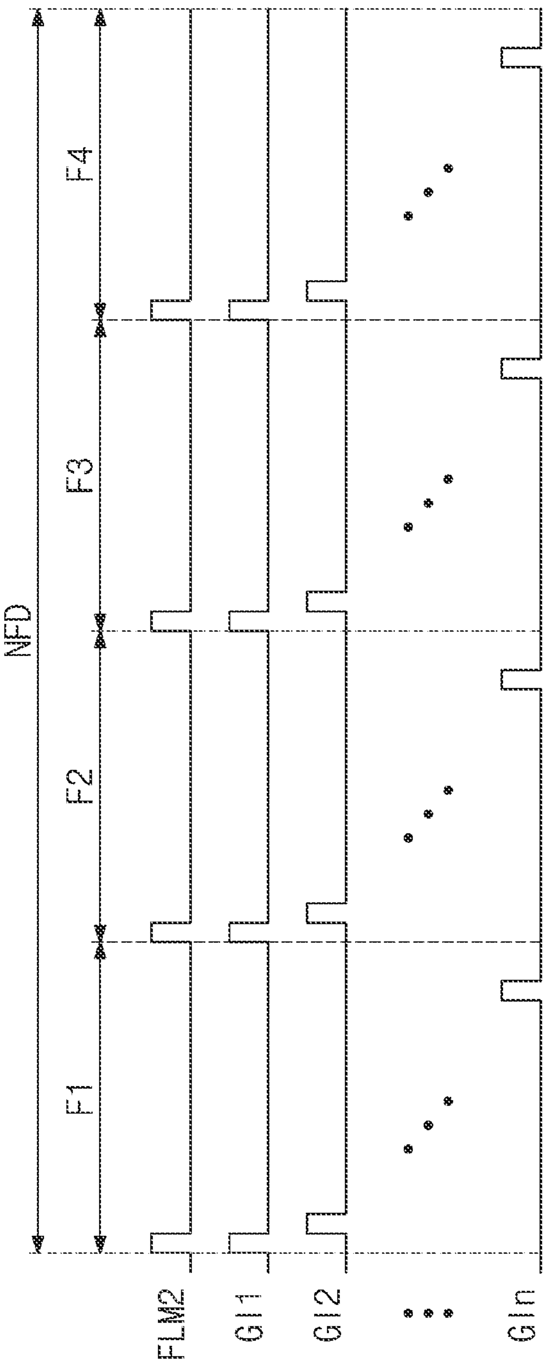
FIG. 24 is a diagram illustrating timings of initialization scan signals output from the stages shown in FIG. 22 in a normal mode.
Figure 25:
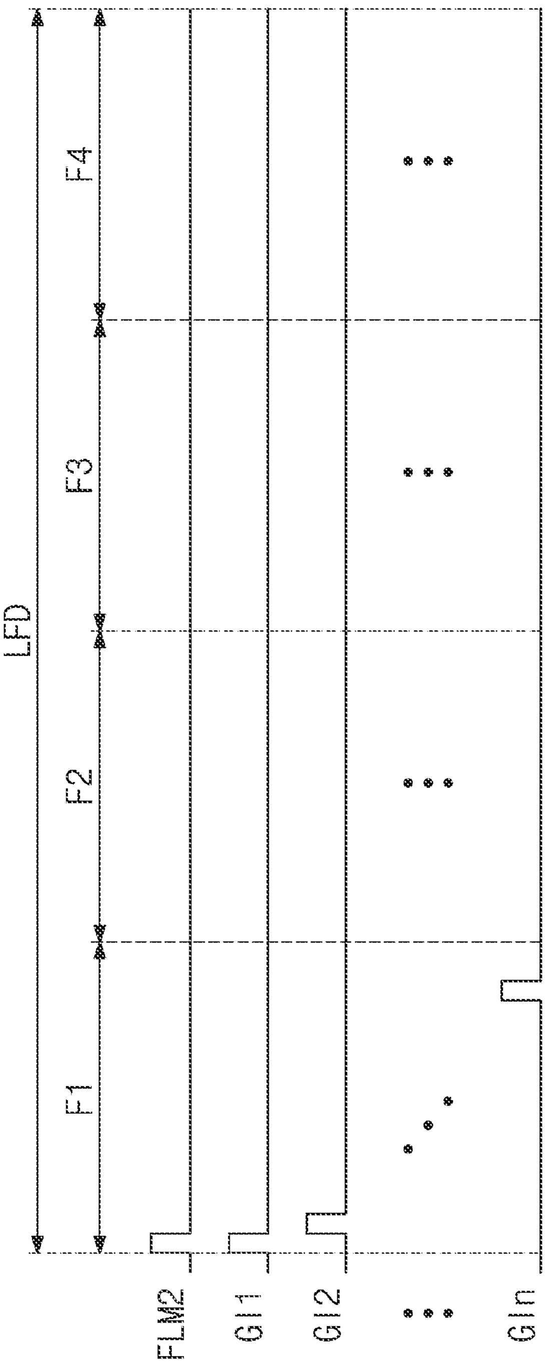
FIG. 25 is a diagram illustrating timings of initialization scan signals output from the stages shown in FIG. 22 in a low-frequency mode.

FIG. 24 is a diagram illustrating timings of initialization scan signals output from the stages shown in FIG. 22 in a normal mode. FIG. 25 is a diagram illustrating timings of initialization scan signals output from the stages shown in FIG. 22 in a low-frequency mode.

FIGS. 24 and 25 illustrate timing diagrams corresponding to those in FIGS. 13 and 14.

Referring to FIGS. 22, 23, and 24, the first stage ST1', which receives the second start signal FLM2, may operate first. Afterward, the second to n-th stages ST2' to STn' may operate sequentially depending on an initialization scan signal output from the previous stage.

During each of the frames F1 to F4, the initialization scan signals GI1 to GIn may be sequentially output and applied to the pixels PX. Accordingly, in the normal mode NFD, the initialization scan signals GI1 to GIn having a first operating frequency (e.g., 120 Hz) may be output by the stages ST1' to STn', respectively.

An operation in which the initialization scan signals GI1 to GIn are applied to the pixels PX may be defined as an activated operation in which the activated initialization scan signals GI1 to GIn having a high level are applied to the pixels PX.

Referring to FIGS. 22, 23, and 25, in the low-frequency mode LFD, the initialization scan signals GI1 to GIn may be output sequentially during the first frame F1. Because the second start signal FLM2 is not applied to the second scan driving circuit SDC2 from the second frame F2, the initialization scan signals GI1 to GIn may not be output from the second frame F2. Accordingly, in the low-frequency mode LFD, the initialization scan signals GI1 to GIn having a second operating frequency (e.g., 1 Hz) may be output by in the stages ST1' to STn', respectively.

An operation in which the initialization scan signals GI1 to GIn are not output may be defined as a deactivated operation in which the deactivated initialization scan signals GI1 to GIn having a low level are output. That is, an operation in which the initialization scan signals GI1 to GIn are not output may be defined as a deactivated operation in which the deactivated initialization scan signals GI1 to GIn are applied to the pixels PX.

Because the initialization scan signals GI1 to GIn are not output during the second to 120th frames F2 to F120 in the low-frequency mode LFD, power consumption may be reduced.

Figure 26:
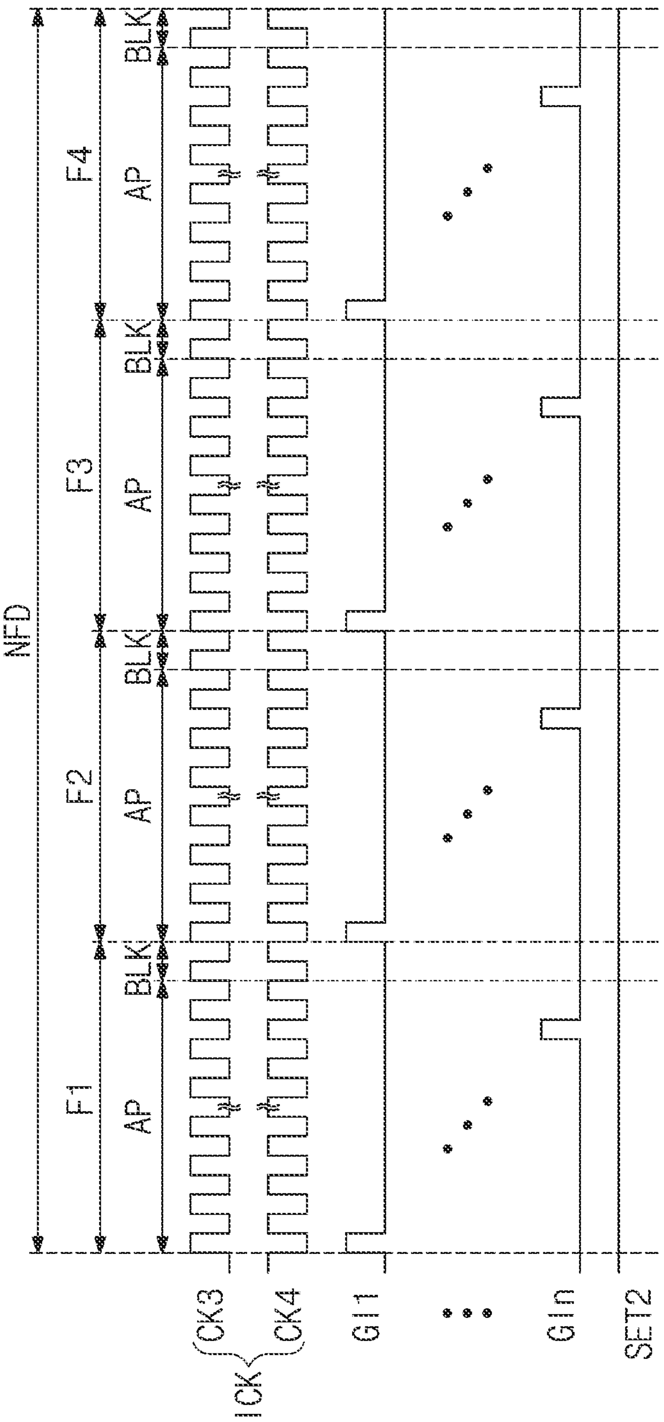
FIG. 26 is a diagram illustrating timings of first and second clock signals, initialization scan signals, and a second set signal in a normal mode.
Figure 27:
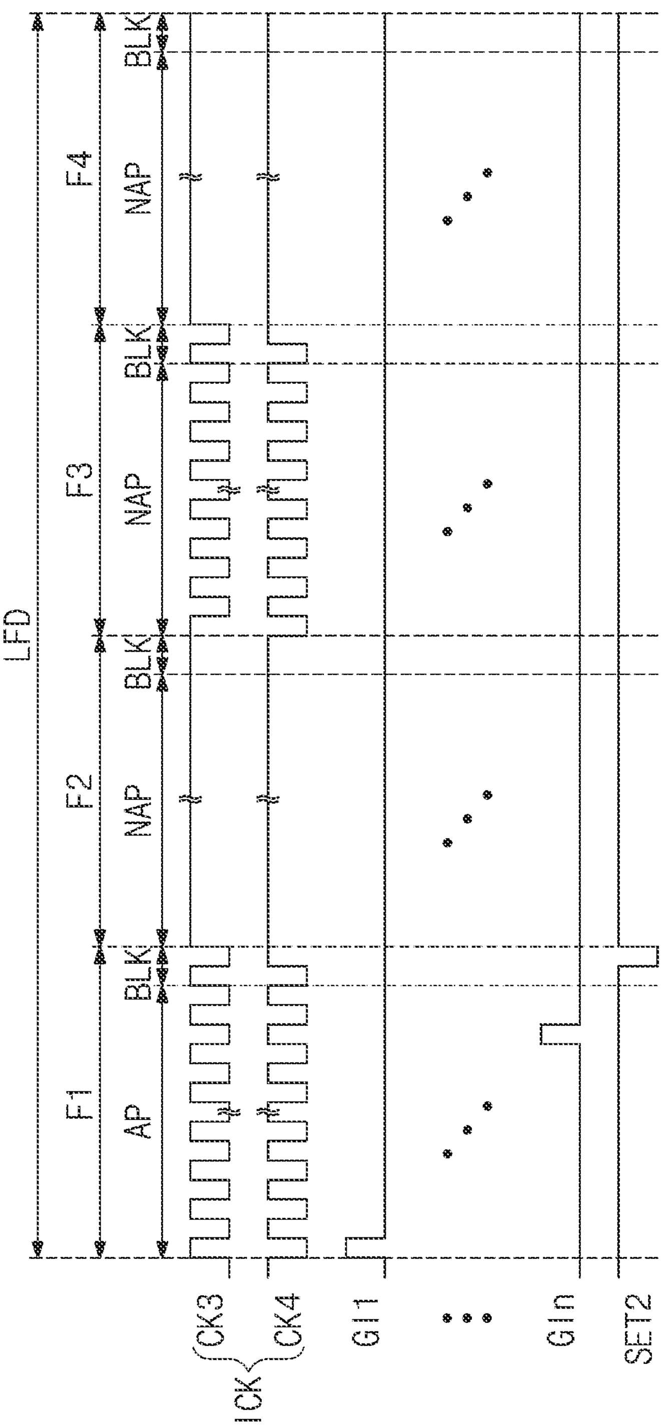
FIG. 27 is a diagram illustrating timings of first and second clock signals, initialization scan signals, and a second set signal in a low-frequency mode.

FIG. 26 is a diagram illustrating timings of third and fourth clock signals, initialization scan signals, and a second set signal in a normal mode. FIG. 27 is a diagram illustrating timings of third and fourth clock signals, initialization scan signals, and a second set signal in a low-frequency mode.

FIGS. 26 and 27 illustrate timing diagrams corresponding to those in FIGS. 15 and 16.

Referring to FIGS. 22, 23, and 26, during each of the frames F1 to F4 of the normal mode NFD, the initialization scan signals GI1 to GIn may be output based on the third and fourth clock signals CK3 and CK4. The initialization scan signals GI1 to GIn may be output from the active period AP of each of the frames F1 to F4 and may be applied to the pixels PX.

In the normal mode NFD, the second set signal SET2 may be a DC signal having a high level. Accordingly, the seventeenth and eighteenth transistors M17 and M18 of the second set part SEP2 may be turned off in the normal mode NFD.

Referring to FIGS. 22, 23, and 27, in the low-frequency mode LFD, the initialization clock signal ICK may have an AC signal in the first frame F1 and may have a DC signal in the second frame F2. Furthermore, the initialization clock signal ICK may have an AC signal in the third frame F3 (not shown), and may have a DC signal in the fourth frame F4.

However, this is an example. The initialization clock signal ICK may have a DC signal in all of the second to 120th frames F2 to F120. Besides, the initialization clock signal ICK may have a DC signal during some consecutive frames among the second to 120th frames F2 to F120 and may have an AC signal during the other consecutive frames. When the second set signal SET2 is applied to the second scan driving circuit SDC2, a level of the initialization clock signal ICK may be changed to a DC level.

In the low-frequency mode LFD, the second scan driving circuit SDC2 may apply the initialization scan signals GI1 to GIn to the pixels PX during the active period AP of the first frame F1. In the low-frequency mode LFD, the second scan driving circuit SDC2 may not apply initialization scan signals GI1 to GIn to the pixels PX during the inactive period NAP. During the inactive period NAP, the initialization scan signals GI1 to GIn may remain at an inactive low level.

During the blank period BLK of the first frame F1, the second set signal SET2 may be activated at a low level. The second scan driving circuit SDC2 may output the deactivated initialization scan signals GI1 to GIn in response to the second set signal SET2 received during the blank period BLK of the first frame F1.

In response to the second set signal SET2, the second set part SEP2 may set the voltage of the first node ND1' to the first high voltage VGH1, and may set the voltage of the second node ND2' to the first low voltage VGL1. Accordingly, the deactivated initialization scan signals GI1 to GIn are output, and thus the initialization scan signals GI1 to GIn may be more stably maintained at a deactivated level.

Figure 28:
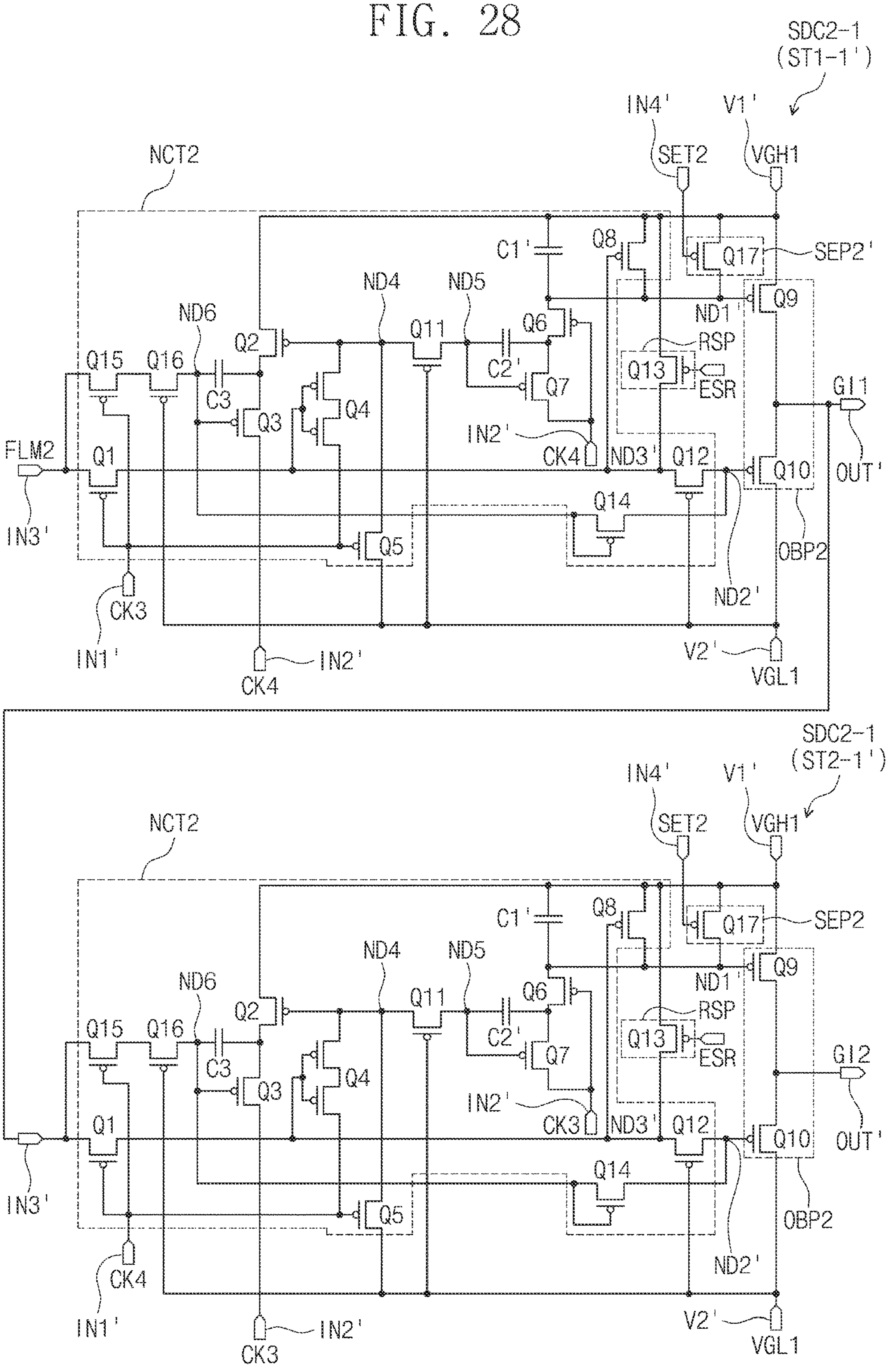
FIG. 28 is a diagram showing a circuit configuration of first and second stages of a second scan driver, according to an embodiment of the present disclosure.

FIG. 28 is a diagram showing a circuit configuration of first and second stages of a second scan driver according to an embodiment of the present disclosure.

First and second stages ST1-1' and ST2-1' shown in FIG. 28 may correspond to the first and second stages ST1' and ST2' shown in FIG. 23. Hereinafter, a configuration of the first stage ST1-1' shown in FIG. 28 will be described focusing on a configuration different from that of the first stage ST1' shown in FIG. 23.

Referring to FIG. 28, unlike the illustration of FIG. 23, a second set part SEP2' may not include the eighteenth transistor Q18, but may include the seventeenth transistor Q17. Accordingly, the second set part SEP2' may receive the first high voltage VGH1 and may apply the first high voltage VGH1 to the first node ND1' in response to the second set signal SET2.

A voltage at the first node ND1' may be set to the first high voltage VGH1, and thus the second output buffer part OBP2 may not output the first high voltage VGH1. Because the voltage at the first node ND1' is set to the first high voltage VGH1 and the ninth transistor Q9 is turned off, the first high voltage VGH1 may not be output.

Figure 29:
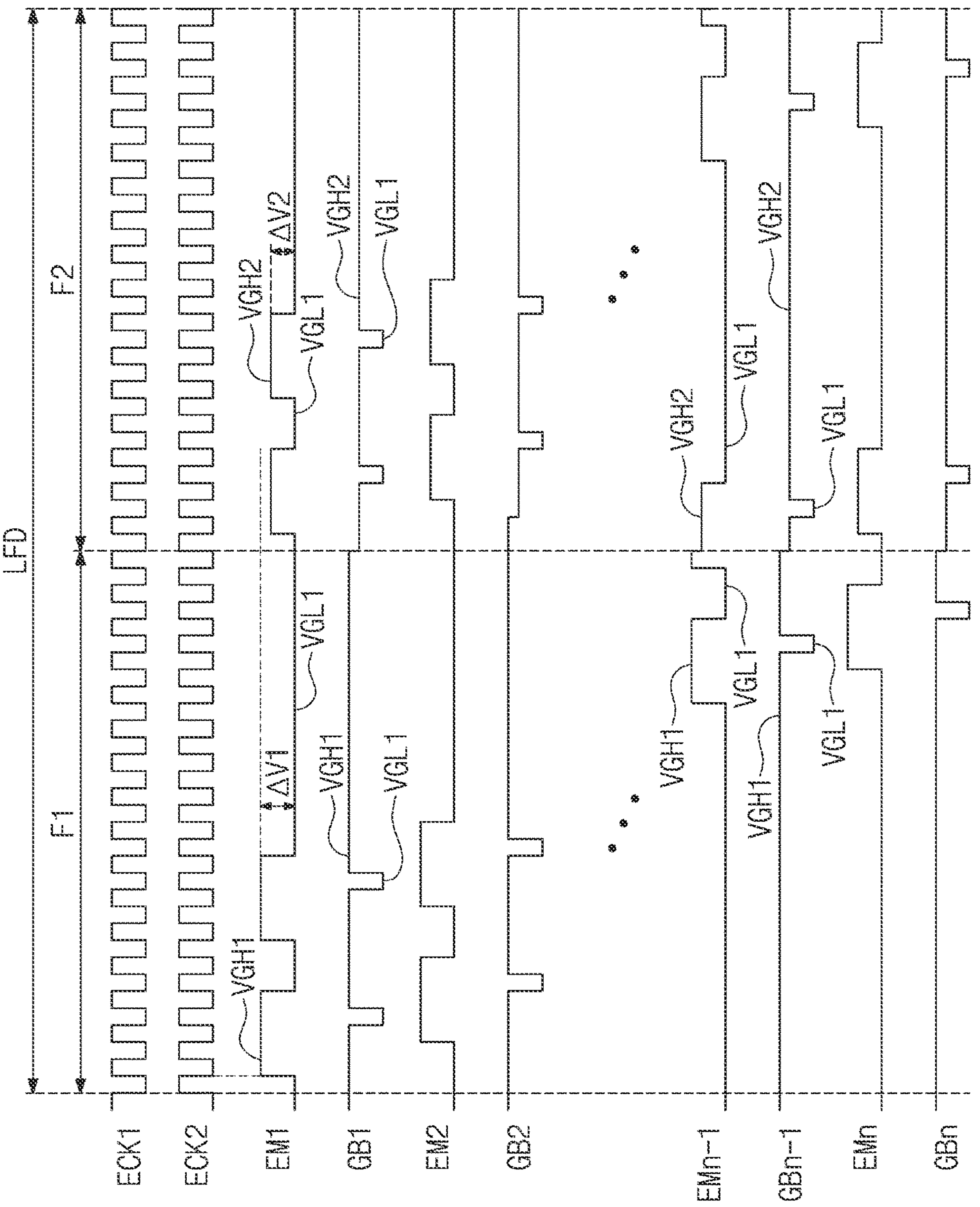
FIG. 29 is a diagram showing a timing of an emission clock, emission signals, and bias scan signals in a normal mode and a low-frequency mode.

FIG. 29 is a diagram showing a timing of an emission clock, emission signals, and bias scan signals in a normal mode and a low-frequency mode.

Although the first and second frames F1 and F2 are shown in FIG. 29, the emission signals EM1 to EMn and the bias scan signals GB1 to GBn may be identically generated until the 120th frame.

Referring to FIG. 29, as described in FIGS. 9 and 10, in the low-frequency mode LFD, the emission signals EM1 to EMn and the bias scan signals GB1 to GBn may be generated during each frame. The emission signals EM1 to EMn and the bias scan signals GB1 to GBn may be applied to the pixels PX through the emission lines EML1 to EMLn and the bias scan lines GBL1 to GBLn.

In the low-frequency mode LFD, during the first frame F1, each of the emission signals EM1 to EMn and each of the bias scan signals GB1 to GBn may have the first high voltage VGH1 and the first low voltage VGL1. Although not shown in drawings, the emission signals EM1 to EMn and the bias scan signals GB1 to GBn in the normal mode NFD may have the first high voltage VGH1 and the first low voltage VGL1 in the same manner as those during the first frame F1 of the low-frequency mode LFD.

In the low-frequency mode LFD, during the second frame F2, each of the emission signals EM1 to EMn and each of the bias scan signals GB 1 to GBn may have the second high voltage VGH2 and the first low voltage VGL1. The second high voltage VGH2 may have a lower level than the first high voltage VGH1. The first low voltage VGL1 may have a lower level than the second high voltage VGH2.

A first voltage difference ΔV1 between the first high voltage VGH1 and the first low voltage VGL1 in the first frame F1 may be greater than a second voltage difference ΔV2 between the second high voltage VGH2 and the first low voltage VGL1 in the second frame F2. As the voltage difference between a high voltage and a low voltage decreases, power consumption may decrease.

Because each of the emission signals EM1 to EMn and each of the bias scan signals GB1 to GBn have the second high voltage VGH2 and the first low voltage VGL1 in the low-frequency mode LFD, the power consumption may be reduced.

The emission signals EM1 to EMn and the bias scan signals GB1 to GBn may be output sequentially. In this case, some of the emission signals EM1 to EMn of the first frame F1 may overlap a boundary between the first frame F1 and the second frame F2.

The (n−1)-th and n-th emission signals EMn−1 and EMn among the emission signals EM1 to EMn may overlap the boundary between the first frame F1 and the second frame F2. However, an embodiment is not limited thereto. Various emission signals at a rear end portion among the emission signals EM1 to EMn may overlap the boundary between the first frame F1 and the second frame F2.

A portion of each of the (n−1)-th and n-th emission signals EMn−1 and EMn overlapping the first frame F1 may have the first high voltage VGH1 and the first low voltage VGL1. A portion of each of the (n−1)-th and n-th emission signals EMn−1 and EMn overlapping the second frame F2 may have the second high voltage VGH2 and the first low voltage VGL1.

In the second frame F2, the first high voltage VGH1 is changed to the second high voltage VGH2, but embodiments of the present disclosure are not limited thereto. For example, in the second frame F2, the first high voltage VGH1 may be maintained and the first low voltage VGL1 may be changed to a second low voltage having a level higher than the first low voltage VGL1. In this case, a difference between the first high voltage VGH1 and the second low voltage may be the second voltage difference ΔV2.

Although described above with reference to an embodiment, it will be understood by those skilled in the art that various modifications and changes may be made in the present disclosure without departing from the spirit and scope of the present disclosure as set forth in the claims below. Furthermore, embodiments of the present disclosure are not intended to limit the technical spirit of the present disclosure. All technical spirits within the scope of the following claims and all equivalents thereof should be construed as being included within the scope of the present disclosure.

According to an embodiment of the present disclosure, when a still image is displayed, the display panel may be driven in a low-frequency mode. In the low-frequency mode, during frames in which a write scan signal is not applied to a pixel, a clock signal applied to a scan driving circuit may have a DC signal, and a DC level of the clock signal may be set to a lower voltage level. Moreover, in the low-frequency mode, during frames in which the write scan signal is not applied to the pixel, the high voltage level of the emission signal may have lower level. Accordingly, power consumption of the display device may be reduced.

Furthermore, in a period between an active period of a first frame and an inactive period of a second frame, a scan signal output from the scan driving circuit may be stably maintained at an inactive level by a set signal applied to the scan driving circuit. Accordingly, the power consumption of the display device may be reduced.

While the present disclosure has been described with reference to embodiments thereof. it will be apparent to those of ordinary skill in the art that various changes and modifications may be made thereto without departing from the spirit and scope of the present disclosure as set forth in the following claims.

What is claimed is:

1. A display device comprising:

a pixel; and a first scan driving circuit configured to apply a write scan signal to the pixel in response to a write clock signal, wherein the first scan driving circuit is configured to output the write scan signal having a first operating frequency in a normal mode and output the write scan signal having a second operating frequency lower than the first operating frequency in a low-frequency mode, and wherein the write clock signal has a direct current (DC) level in the low-frequency mode in response to a first set signal applied to the first scan driving circuit.

2. The display device of claim 1, wherein the first scan driving circuit outputs a deactivated write scan signal in response to the first set signal received in a period between an active period in which the write scan signal is applied to the pixel and an inactive period in which the write scan signal is not applied to the pixel.

3. The display device of claim 2, wherein the low-frequency mode includes:

a first frame including the active period and a blank period following the active period; and a second frame including the inactive period and a blank period following the inactive period, wherein the first set signal is applied to the first scan driving circuit in the blank period of the first frame, and wherein the write clock signal has an alternating current (AC) during the first frame and has a direct current (DC) during the second frame.

4. The display device of claim 3, wherein the write clock signal has a first high voltage and a first low voltage lower than the first high voltage during the first frame and has a second high voltage lower than the first high voltage and higher than the first low voltage during the second frame.

5. The display device of claim 3, wherein the low-frequency mode further includes a plurality of subsequent frames following the second frame, wherein each of the plurality of subsequent frames includes the inactive period and the blank period following the inactive period, and wherein the first set signal is further applied to the first scan driving circuit in at least one blank period among the blank periods of the second frame and the subsequent frames.

6. The display device of claim 5, wherein the first set signal is applied to the first scan driving circuit inversely proportional to the second operating frequency.

7. The display device of claim 3, wherein the first scan driving circuit includes:

a first node controller connected to a first node and a second node and configured to receive a first high voltage, a first low voltage having a level lower than the first high voltage, a first start signal, a first clock signal, and a second clock signal having a phase opposite to a phase of the first clock signal, and to control voltage levels of the first node and the second node;

a first output buffer part connected to the first node and the second node and configured to receive the first high voltage and the second clock signal and to output the write scan signal depending on the voltage levels of the first node and the second node; and a first set part connected to the first node and the second node and configured to receive the first set signal, and wherein the first output buffer part output the first high voltage or the second clock signal depending on a voltage of the first node and the second node.

8. The display device of claim 7, wherein the first set part receives the first high voltage and the first low voltage, sets the voltage of the first node to the first low voltage, and sets the voltage of the second node to the first high voltage in response to the first set signal such that the first output buffer part outputs the deactivated write scan signal.

9. The display device of claim 7, wherein the first set part receives a second high voltage and a second low voltage, sets the voltage of the first node to the second low voltage, and sets the voltage of the second node to the second high voltage in response to the first set signal such that the first output buffer part outputs the deactivated write scan signal, and wherein the second high voltage has a different level from the first high voltage, and the second low voltage has a different level from the first low voltage and has a lower level than the second high voltage.

10. The display device of claim 3, further comprising:

a second scan driving circuit configured to apply an initialization scan signal to the pixel in response to an initialization clock signal, and wherein the second scan driving circuit outputs the deactivated initialization scan signal in response to a second set signal received in the blank period of the first frame.

11. The display device of claim 10, wherein, in the low-frequency mode, the second scan driving circuit applies the initialization scan signal to the pixel during the active period and does not apply the initialization scan signal to the pixel during the inactive period.

12. The display device of claim 10, wherein the low-frequency mode further includes a third frame following the second frame, and wherein the initialization clock signal has an alternating current (AC) during the first frame and the third frame, and has a direct current (DC) during the second frame.

13. The display device of claim 10, wherein the second scan driving circuit includes:

a second node controller connected to a first node and a second node and configured to control voltage levels of the first node and the second node in response to a first high voltage, a first low voltage having a lower level than the first high voltage, a second start signal, and the initialization clock signal;

a second output buffer part connected to the first node and the second node and configured to receive the first high voltage and the first low voltage and to output the initialization scan signal depending on the voltage levels of the first node and the second node; and a second set part connected to the first node and the second node and configured to receive the second set signal, wherein the second output buffer part output the first high voltage or the first low voltage according to a voltage of the first node and the second node.

14. The display device of claim 13, wherein the second set part receives the first high voltage and the first low voltage, sets the voltage of the first node to the first high voltage, and sets the voltage of the second node to the first low voltage in response to the second set signal such that the second output buffer part outputs the deactivated initialization scan signal.

15. The display device of claim 10, wherein the second scan driving circuit includes:

a second node controller connected to a first node and a second node and configured to control voltage levels of the first node and the second node in response to a first high voltage, a first low voltage having a lower level than the first high voltage, a second start signal, and the initialization clock signal;

a second output buffer part connected to the first node and the second node and configured to receive the first high voltage and the first low voltage and to output the initialization scan signal depending on the voltage levels of the first node and the second node; and a second set part connected to the first node and configured to receive the second set signal, and wherein the second output buffer part determines an output of the first high voltage depending on a voltage of the first node, and determines an output of the first low voltage according to a voltage of the second node.

16. The display device of claim 15, wherein the second set part receives the first high voltage, and sets the voltage of the first node to the first high voltage in response to the second set signal such that the second output buffer part does not output the first high voltage.

17. The display device of claim 3, wherein the pixel further receives a bias scan signal and an emission signal, wherein, during the first frame, the bias scan signal and the emission signal have a first high voltage and a first low voltage having a level lower than the first high voltage, and wherein, during the second frame, the bias scan signal and the emission signal have a second high voltage having a level lower than the first high voltage, and the first low voltage having a level lower than the second high voltage.

18. The display device of claim 17, wherein, when the emission signal overlaps a boundary between the first frame and the second frame, a portion of the emission signal that overlaps the first frame has the first high voltage and the first low voltage, and a portion of the emission signal that overlaps the second frame has the second high voltage and the first low voltage.

19. An electronic device comprising a display device for providing images, wherein the display device comprises:

a pixel configured to receive a scan signal; and a scan driving circuit configured to output the scan signal having a first operating frequency during a normal mode, and to output the scan signal having a second operating frequency less than the first operating frequency during a low-frequency mode, wherein the scan driving circuit includes:

a first node controller connected to a first node and a second node and configured to receive a first high voltage, a first low voltage having a level lower than the first high voltage, a start signal, a first clock signal, and a second clock signal having a phase opposite to a phase of the first clock signal, and to control voltage levels of the first node and the second node;

a first buffer part connected to the first node and configured to receive the first high voltage;

a second buffer part connected to the second node and configured to receive either one clock signal among the first clock signal and the second clock signal or the first low voltage; and a switching element connected to an input terminal for receiving the start signal and the second node and switched by a set signal, wherein the first buffer part and the second buffer part output the scan signal depending on the voltage levels of the first node and the second node, and wherein the switching element is turned off in response to the set signal when the scan signal is not applied to the pixel in the low-frequency mode.

20. A scan driving circuit comprising:

a node controller connected to a first node and a second node and configured to receive a first high voltage, a first low voltage having a level lower than the first high voltage, a start signal, a first clock signal, and a second clock signal having a phase opposite to a phase of the first clock signal, and to control voltage levels of the first node and the second node;

a first buffer part connected to the first node and configured to receive the first high voltage;

a second buffer part connected to the second node and configured to receive either one clock signal among the first clock signal and the second clock signal or the first low voltage; and a set part connected to the first node and the second node and configured to receive the first high voltage, the first low voltage, and a set signal, wherein the first buffer part and the second buffer part output a scan signal depending on the voltage levels of the first node and the second node, and wherein the set part sets the voltage levels of the first node and the second node in response to the set signal such that a deactivated scan signal is output.

* * * * *